United States Patent
Yue et al.

(10) Patent No.: US 9,144,076 B2
(45) Date of Patent: Sep. 22, 2015

(54) USER PAIRING AND RESOURCE ALLOCATION FOR DOWNLINK MULTIUSER MULTI-INPUT-MULTI-OUTPUT IN LONG TERM EVOLUTION ADVANCED SYSTEMS

(71) Applicants: Guosen Yue, Plainsboro, NJ (US); Narayan Prasad, Wyncote, PA (US); Sampath Rangarajan, Bridgewater, NJ (US)

(72) Inventors: Guosen Yue, Plainsboro, NJ (US); Narayan Prasad, Wyncote, PA (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 621 days.

(21) Appl. No.: 13/622,012

(22) Filed: Sep. 18, 2012

(65) Prior Publication Data

US 2013/0250868 A1      Sep. 26, 2013

Related U.S. Application Data

(60) Provisional application No. 61/536,017, filed on Sep. 18, 2011.

(51) Int. Cl.
*H04W 4/00* (2009.01)
*H04W 72/06* (2009.01)
*H04L 5/00* (2006.01)
*H04L 27/26* (2006.01)

(52) U.S. Cl.
CPC ............ *H04W 72/06* (2013.01); *H04L 5/0037* (2013.01); *H04L 27/2601* (2013.01)

(58) Field of Classification Search
None
See application file for complete search history.

(56) References Cited

U.S. PATENT DOCUMENTS

2013/0329826 A1* 12/2013 Andreozzi et al. ............ 375/267

OTHER PUBLICATIONS

"Genetic and Greedy User Scheduling for Multiuser MIMO Systems with Successive Zero-Forcing," by Elliott et al., in Proc. IEEE GlobeCom, Honolulu, HI, 2009.*

* cited by examiner

*Primary Examiner* — Kwang B Yao
*Assistant Examiner* — Hardikkumar Patel
(74) *Attorney, Agent, or Firm* — Joseph Kolodka

(57) ABSTRACT

A method for user pairing and resource allocation, includes performing a multiuser multi-input-multi-output (MU-MIMO) user pairing process to maximize an objective metric without common rank restriction; performing a rank balancing process to determine a uniform transmission user rank along all allocated resource blocks for each user; and with the uniform transmission user rank fixed for all the users, determining optimal user pairing and allocation for each of the resource blocks for each user.

21 Claims, 9 Drawing Sheets

Initially set the user set $\mathcal{U}$ for all candidate users and $\mathcal{A}$=emptyset as the paired user set for this RB n with the initial weighted sum rate $v_n$=0.

↓

Evaluate the performance of pairing the user in $\mathcal{U}$ with the user in $\mathcal{A}$ and the pairing should satisfy the MU-MIMO user pairing constraints. Find the one, e.g., k*, resulting in the highest weight sum rate and also a larger rate than previous pairing performance of $\mathcal{A}$ and update $\mathcal{A} \leftarrow \mathcal{A} \cup \{k^*\}$. Remove k* and other users which does not satisfy the near-orthognality constraints with $\mathcal{A}$ from the user set $\mathcal{U}$.

Repeat until $\mathcal{U}$ is empty or other termination condition is satisfied.

FIG. 8

USER PAIRING AND RESOURCE ALLOCATION FOR DOWNLINK MULTIUSER MULTI-INPUT-MULTI-OUTPUT IN LONG TERM EVOLUTION ADVANCED SYSTEMS

RELATED APPLICATIONS

This application claims the benefit of U.S. Provisional Application No. 61/536,017 filed Sep. 18, 2011, the entire disclosure of which is incorporated herein by reference.

FIELD

The present disclosure relates to broadband communications & networking and in particular, to a multiuser (MU) multi-input-multi-output (MIMO) scheduling process based on rank balancing.

BACKGROUND

In joint user pairing and resource allocation, scheduling is considered for downlink (DL) multiuser (MU) multi-input-multi-output (MIMO) with linear precoding in which a base station schedules several user terminals to transmit at the same resource block (RB), based on certain channel information available at the base station. Several practical constraints are considered including common rank constraint, maximum number of layers allowed for MU pairing on each RB, and maximum number of layers per user allowed for MU-MIMO transmission on each RB, where the rank or the transmission rank of a user denotes the number of data symbols that are simultaneously transmitted before precoding or the number of columns of the linear precoding matrix for a user. The dynamic switching between single-user (SU) MIMO and MU-MIMO should be supported by the scheduler.

The MU-MIMO scheduling problem can be posed as an optimization problem to maximize the weighted sum rate over all available RBs as the objective function. However, with the above practical constraints, finding the optimal solution of such problem becomes non-deterministic polynomial-time hard (NP-hard).

A greedy algorithm (method) and a genetic method for MU-MIMO user pairing are presented in "Genetic and Greedy User Scheduling for Multiuser MIMO Systems with Successive Zero-Forcing," by Elliott et al., in *Proc. IEEE GlobeCom*, Honolulu, Hi., 2009, which only considers the narrowband MU-MIMO user pairing. The methods described by Elliot et al. do not solve the problem of MU-MIMO scheduling for wideband MIMO-OFDM with common rank constraint over all scheduled RBs.

With the rank restriction, the transmission rank for each user is then determined. The optimal user pairing and greedy method can be applied to wideband scheduling but it suffers the loss on the throughput performance.

Accordingly, improved methods are needed to achieve better throughput performance.

SUMMARY

Disclosed herein is a method for user pairing and resource allocation. The method may include performing a multiuser multi-input-multi-output (MU-MIMO) user pairing process to maximize an objective metric without common rank restriction; performing a rank balancing process to determine a uniform transmission user rank along all allocated resource blocks for each user; and with the uniform transmission user rank fixed for all the users, determining optimal user pairing and allocation for each of the resource blocks for each user.

BRIEF DESCRIPTION OF THE DRAWINGS

FIG. 8 is a flowchart of a prior art greedy MU-MIMO paring method with rank restriction.

DETAILED DESCRIPTION

The present disclosure presents several suboptimal methods to solve the wideband MU-MIMO scheduling problem with several practical constraints, particularly, the common rank constraint along all RBs. Specifically, a rank balancing method and several methods based on this idea are disclosed herein. Some of the methods are proved to have a guarantee on their optimality. Also disclosed herein are an improved greedy method with rank constraint, an iterative scheduling method with stochastic update, and a rank fixing based on SU-MIMO greedy approach. The MU-MIMO scheduling methods of the present disclosure provide better performance than existing schemes and supports dynamic SU and MU-MIMO switching. Some of them enjoy lower complexity than existing schemes.

Figure 9:
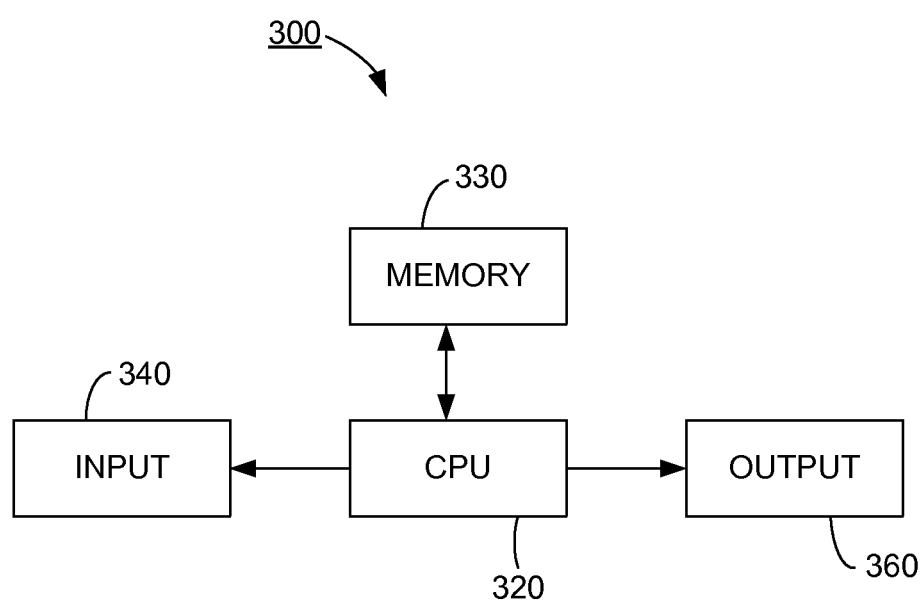
FIG. 9 is a block diagram of an exemplary embodiment of a computer system or apparatus that may be used for executing the methods described herein.

FIG. 9 is a block diagram of an exemplary embodiment of a computer system or apparatus 300 that may be used for executing the methods described herein. The computer system 300 may include at least one CPU 320, at least one memory 330 for storing one or more programs which are executable by the CPU 320 for performing the methods described herein, one or more inputs 340 for receiving input data and an output 360 for outputting data. One of ordinary skill in the art will appreciate that the methods disclosed herein can be executed on any other suitable computer, computer system, or apparatus that contains one or more CPUs capable of executing program instructions which when executed by the one or more CPUs, perform the methods described herein.

The present disclosure considers the downlink (DL) linear precoded MU-MIMO in which the base station co-schedules several user terminals on the same RB. For wideband orthogonal frequency-division multiplexing (OFDM) system, a certain number of RBs in the frequency domain are available for transmission at the same time slot. The present disclosure also considers the MU-MIMO scheduling on the available RBs to maximize the weight sum rate subjected to several practical constraints specified by the 3GPP (3rd Generation Partnership Project) standard for LTE-Advanced system. The scheduling problem can be described as follows:

max weighed sum rate over all available RBs
over all possible user sets, transmission rank and precoding matrices,
subject to the constraints:
the transmission rank for each user is uniform along all RBs
Maximum $\overline{M}$ co-scheduled layers per RB for MU-MIMO transmission
Maximum $\overline{m}$ layers per user for MU-MIMO transmission
Some other constraints applied for SU-MIMO are also naturally considered in the optimization such as the transmission rank not larger than the feedback rank. By solving the optimization we can determine the user set allocated on each RB and the transmission rank for each user, as well as associated precoding matrices.

Mathematically, the above optimization can be summarized as $$\max_{\{u^{(n)}, r^{(n)}\}_{n=1}^{N}} \sum_{n \in B} \xi(u^{(n)}, r^{(n)}),$$

$$\text{s.t.} \begin{cases} \Sigma_{k \in u^{(n)}} r_k^{(n)} \leq \overline{M} \\ \|r^{(n)}\|_\infty \leq \overline{m} \\ u^{(n)} \cap \tilde{u}^c = \emptyset, \end{cases}$$

$$\forall |u^{(n)}| \geq 2,$$

$$r_k^{(n)} = r_k^{(m)}, \text{ if } k \in u^{(n)} \cap u^{(m)}, \forall n \neq m$$

where $U^{(n)}$ is the set of co-scheduled users at the nth RB, $r^{(n)} = [r_1^{(n)}, \ldots, r_K^{(n)}]$ with $r_K^{(n)} = r_k$ if $k \in U^{(n)}$ and $r_K^{(n)} = 0$, otherwise, $r_k$ is the transmission rank of user k; $\xi(U^{(n)}, r^{(n)})$ denotes the weighted sum rate on the nth RB for co-scheduled user set $U^{(n)}$ with transmission ranks for the co-scheduled users defined by $r^{(n)}$; $\tilde{U}^c$ is the set of users that can only be scheduled for the SU-MIMO transmissions with feedback rank greater than $\overline{m}$.

Figure 1:
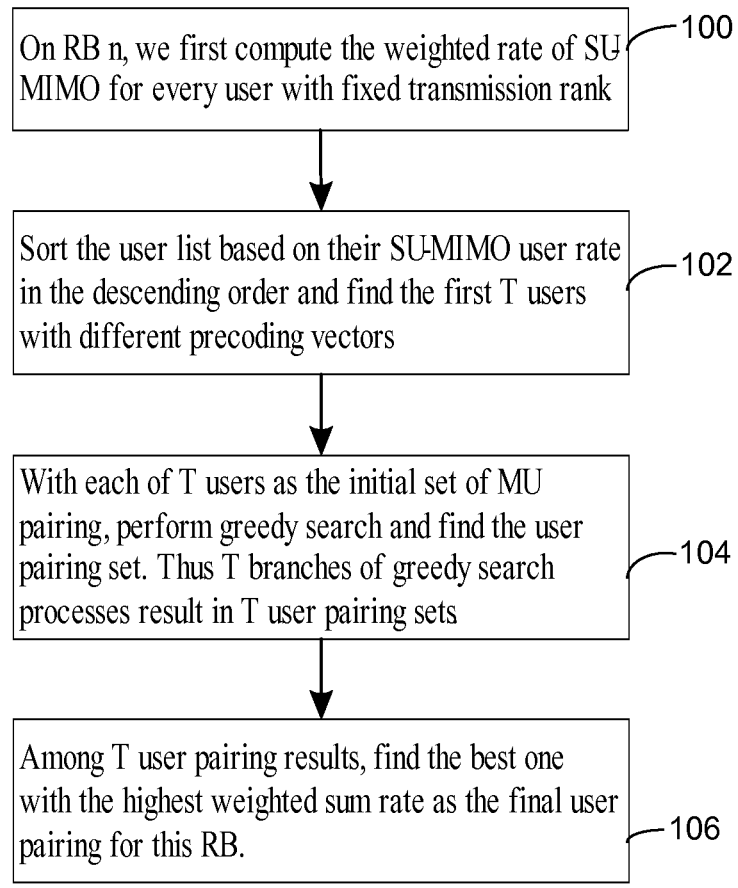
FIG. 1 is a flowchart of an embodiment of an improved greedy search method for multiuser (MU) pairing with rank restriction.

FIG. 1 is a flowchart of a scheduling method according to an embodiment of the present disclosure. The method provides an improved greedy method with rank restriction. Rank restriction fixes the transmission rank for every user. The MU-MIMO scheduling can be decoupled as per RB based user pairing. In this method, several parallel branches of the greedy method with different initial points are executed in parallel on each RB. The best one is selected as the final pairing. The method commences in block 100 of FIG. 1, where a weighted rate of SU-MIMO for every user with a fixed transmission rank is determined for each RB n and listed in a user list. In block 102, the users in the list are sorted based on their SU-MIMO user rate in descending order and the first T users with different precoding vectors are determined. In block 104, with each of the T users as the initial set of MU pairing, a greedy search is performed and user pairing sets are determined. Thus, T branches of the greedy search processes result in T user pairing sets. In block 106, the best T user pairing with the highest weighted sum rate is determined among the T user pairing results, and this T user pairing is deemed as the final user pairing for the selected RB n.

Figure 2:
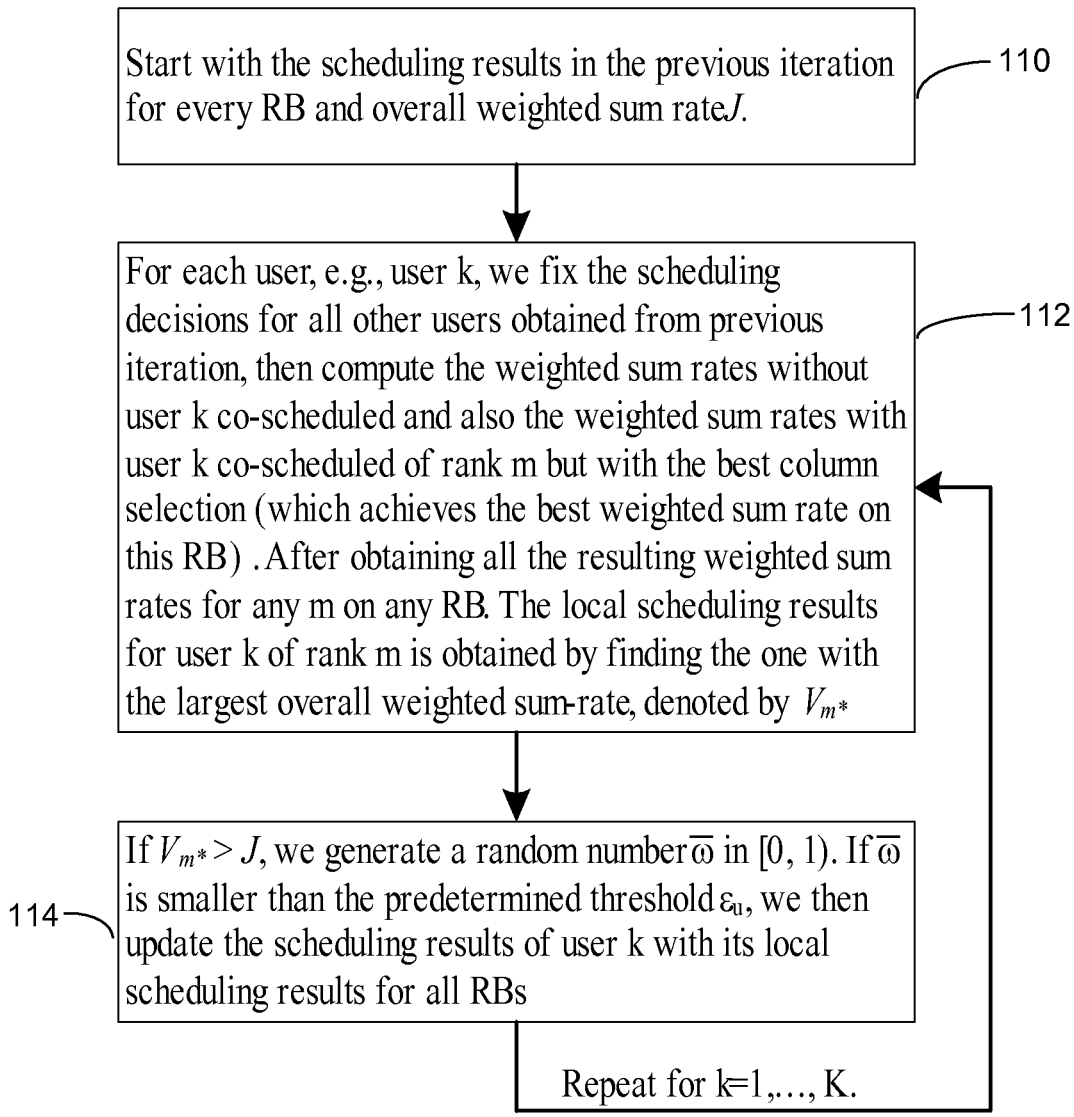
FIG. 2 is a flowchart of an embodiment of the processes for one iteration of a MU-multi-input-multi-output (MIMO) scheduling method with stochastic updating.

FIG. 2 is a flow chart of a scheduling method according to another embodiment of the present disclosure. The processes depicted in FIG. 2 are for one iteration of this iterative method, therefore, the method will operate the processes repeatedly until the resulting weighted sum-rate over all RBs converges or the maximum number of iterations is reached. The method comprises an iterative method with stochastic updating. The general concept of this embodiment is that in each iteration, for each user, we evaluate the iteration's local best user pairing and resource allocation, with the allocations of all other users being fixed from the previous iteration. If the local pairing decision for the selected user results in a larger overall weighted sum rate, we then update the scheduling results from these local results to the previous scheduling results with a random toss. The flow chart of FIG. 2, depicts the procedures in each iteration for this method. The method commences in block 110 of FIG. 2, with the scheduling results from the previous iteration for every RB and overall weighted sum rate J. Then, in block 112, for each user, e.g., user k, we fix the scheduling decisions for all other users obtained from the previous iteration of block 110, and determine weighted sum rates without user k co-scheduled and weighted sum rates with user k co-scheduled, of rank m, but with the best column selection (which achieves the best weighted sum rate on this RB). After obtaining all the resulting weighted sum rates for any rank m on any RB, the local scheduling results for user k of rank m are obtained by finding the local scheduling result with the largest overall weighted sum-rate, denoted by $V_{m^*}$. If the weighted sum rates without user k co-scheduled is the best, then best rank m* can be set to 0 and $V_{m^*}$ denotes the weighted sum-rate without user k co-scheduled. The logic flows to block 114 where a determination is made as to whether $V_{m^*}$ is greater than J. If it is determined that $V_{m^*}$ is greater than J, a random number $\overline{\omega}$ in [0,1) is generated. If $\overline{\omega}$ is smaller than predetermined threshold $\epsilon_u$, then the scheduling results of user k are updated with its local scheduling results for all RBs. The method then loops back and blocks 112 and 114 are repeated for k=1, ..., K.

The scheduling method according to another embodiment may comprise a greedy method with SU-MIMO rank fixing. This method uses the SU-MIMO greedy method to determine user rank, and then performs MU-MIMO scheduling with per RB based user pairing. More specifically, the method performs SU-MIMO scheduling and then obtains resource allocations. The method then determines user rank based on the resource allocations. With the fixed rank, MU-MIMO scheduling is performed in a decoupled manner for each RB using scheduling with rank restriction, e.g., an exhaustive search method, a greedy method and the improved greedy method disclosed above.

Figure 3:
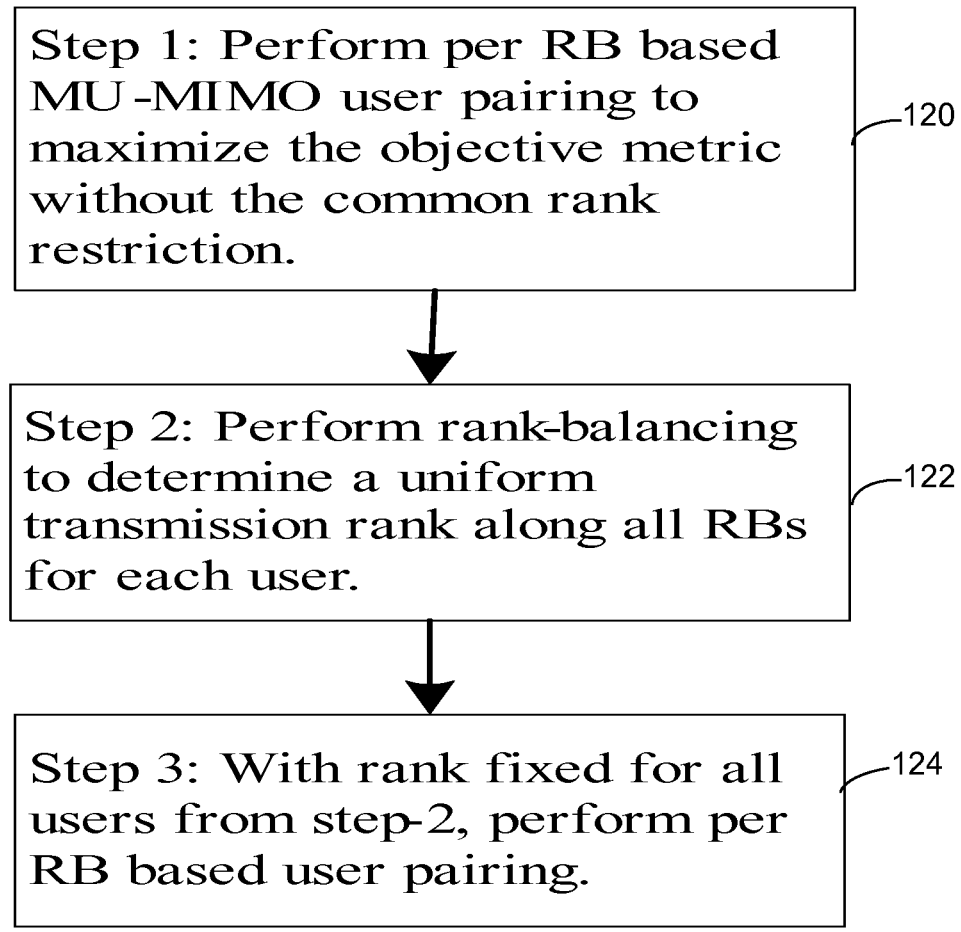
FIG. 3 is a high level flowchart of an embodiment of a MU-MIMO scheduling method with rank balancing.

The scheduling method of the present disclosure, in some embodiments, may comprise a rank balancing scheduling method. In accordance with a certain embodiment of the rank balancing based method, scheduling with rank balancing for feedback rank $\hat{r}_k \leq \overline{m}$, where $\overline{m}$ is maximum number of layers per user, allows for MU pairing. For LTE-A, $\overline{m}=2$. FIG. 3 is a flow chart of a MU-MIMO scheduling method with rank-balancing according to an embodiment of the present disclosure. The method commences in block 120 where per RB based MU-MIMO user pairing is performed to maximize an objective metric without common rank restriction. The logic then flows to block 122 where rank balancing is performed to determine a uniform transmission rank along all RBs for each user. The logic flows to block 124 where per RB based user pairing is performed with the rank fixed for all users from block 122.

Figure 4:
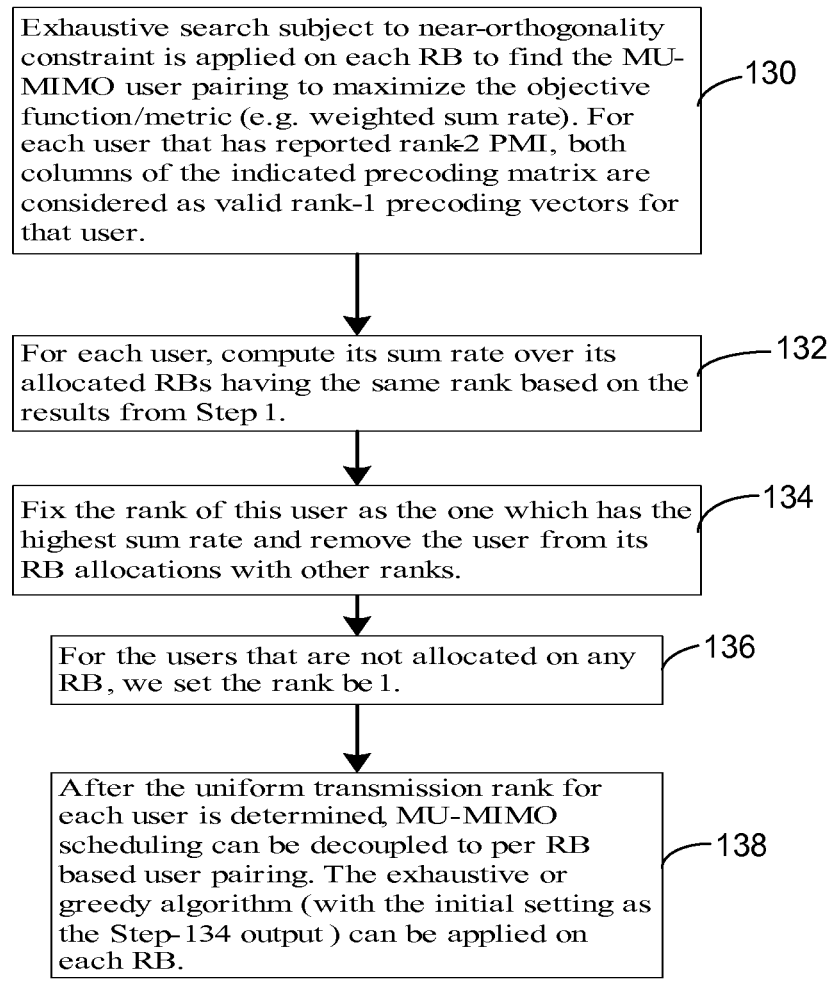
FIG. 4 is a flowchart of an embodiment of a rank balancing based MU-MIMO scheduling method derived from the method depicted in FIG. 3.

FIG. 4 is a flowchart of a scheduling method with $\overline{m}=2$. The method of FIG. 4 is based on the method FIG. 3 and achieves ½-approximation of the optimal solutions for $\overline{m}=2$. Block 130, blocks 132, 134, and 136, and block 138, of FIG. 4 correspond to blocks 102, 122, and 124, respectively of FIG. 3. Starting with block 130, an exhaustive search subject to a near-orthogonality constraint is applied to each RB to find the MU-MIMO user pairing to maximize the objective function/metric (e.g. weighted sum rate) without common rank restriction. For each user that has reported rank-2 with preferred precoding matrix indicated by preferred matrix index (PMI) in the rank-2 precoding codebook, both columns of the indicated precoding matrix are considered as valid rank-1 precoding vectors for that user. In block 132, for every scheduled user, the sum rate of m is computed over the user's allocated RBs having the same rank m based on the results of block 130, $m=1,\ldots,\hat{r}_k$. In block 134, the rank of each user is fixed as the one which has the highest sum rate and this user is removed from the user's RB allocations with other ranks. In block 136, for users that are not allocated on any RB, the rank is set to 1. In block 138, after the uniform transmission rank for each user has been determined, MU-MIMO scheduling can be decoupled to per RB based user pairing. The exhaustive or greedy method, with the initial setting as the output of blocks 132-134, can be applied on each RB.

Figure 5:
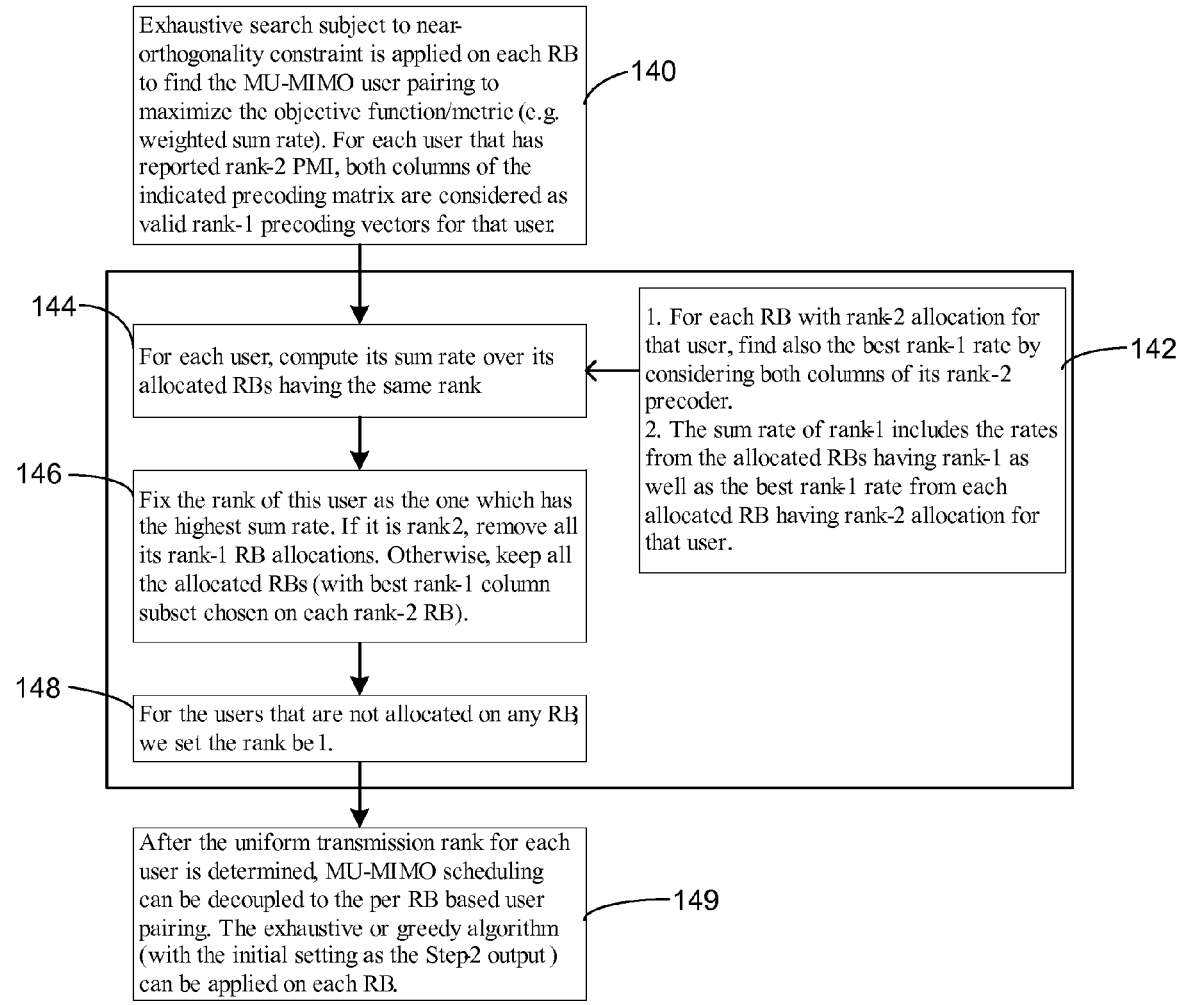
FIG. 5 is a flowchart of another embodiment of a rank balancing based MU-MIMO scheduling method derived from the method depicted in FIG. 3.

FIG. 5 is a flowchart of an improved variant of the scheduling method of FIG. 4, with $\overline{m}=2$. The method of FIG. 5 is also based on the method of FIG. 3 and achieves ⅔-approximation of the optimal solutions for $\overline{m}=2$. Block 140, blocks 142, 144, 146, and 148, and block 149, of FIG. 5 correspond to blocks 102, 122, and 124, respectively of FIG. 3. Starting with block 140, an exhaustive search subject to a near-orthogonality constraint is applied to each RB to find the MU-MIMO user pairing to maximize the objective function/metric (e.g. weighted sum rate). For each user that has reported rank-2 PMI, both columns of the indicated precoding matrix are considered as valid rank-1 precoding vectors for that user. In block 142, for each RB with rank-2 allocation for that user, find the best rank-1 rate by considering both columns of its rank-2 precoder. The sum rate of rank-1 includes the rates form the allocated RBs having rank-1 as well as the best rank-1 rate from each allocated RB having rank-2 allocation for that user. In block 144, for each user, the sum rate of the rank m is computed over the user's allocated RBs assuming having the same rank $m<=r_k^{(n)}$, and the sum-rate of example of $m<r_k^{(n)}$ is based on the procedures of blocks 140 and 142 for an example of m=1 and $r_k^{(n)}=2$. In block 146, the rank of each user is fixed as the one which has the highest sum rate. If the user's rank is rank-2, all its rank-1 RB allocations are removed, otherwise, all the allocated RBs are kept, with the best rank-1 column subset selected on each rank-2 RB. In block 148, for users that are not allocated on any RB, the rank is set to 1. In block 149, after the uniform transmission rank for each user has been determined, MU-MIMO scheduling can be decoupled to per RB based user pairing. The exhaustive or greedy method, with the initial setting as the output of blocks 142-148, can be applied on each RB.

In accordance with another embodiment of the rank balancing based method, rank balancing based scheduling is performed with some users having the feedback rank $\hat{r}_k > \overline{m}$. It is assumed that the users with the feedback rank $\hat{r}_k > \overline{m}$, can only be scheduled for SU-MIMO transmission. In LTE-A, based on UE reported rank, for users with a feedback rank greater than $\overline{m}=2$, only SU-MIMO transmissions are scheduled. This is because the reported PMI does not have good directional information. Therefore, the present disclosure presents in FIG. 6, a rank balancing based MU scheduling method combined with the greedy SU-MIMO scheduling.

Figure 6:
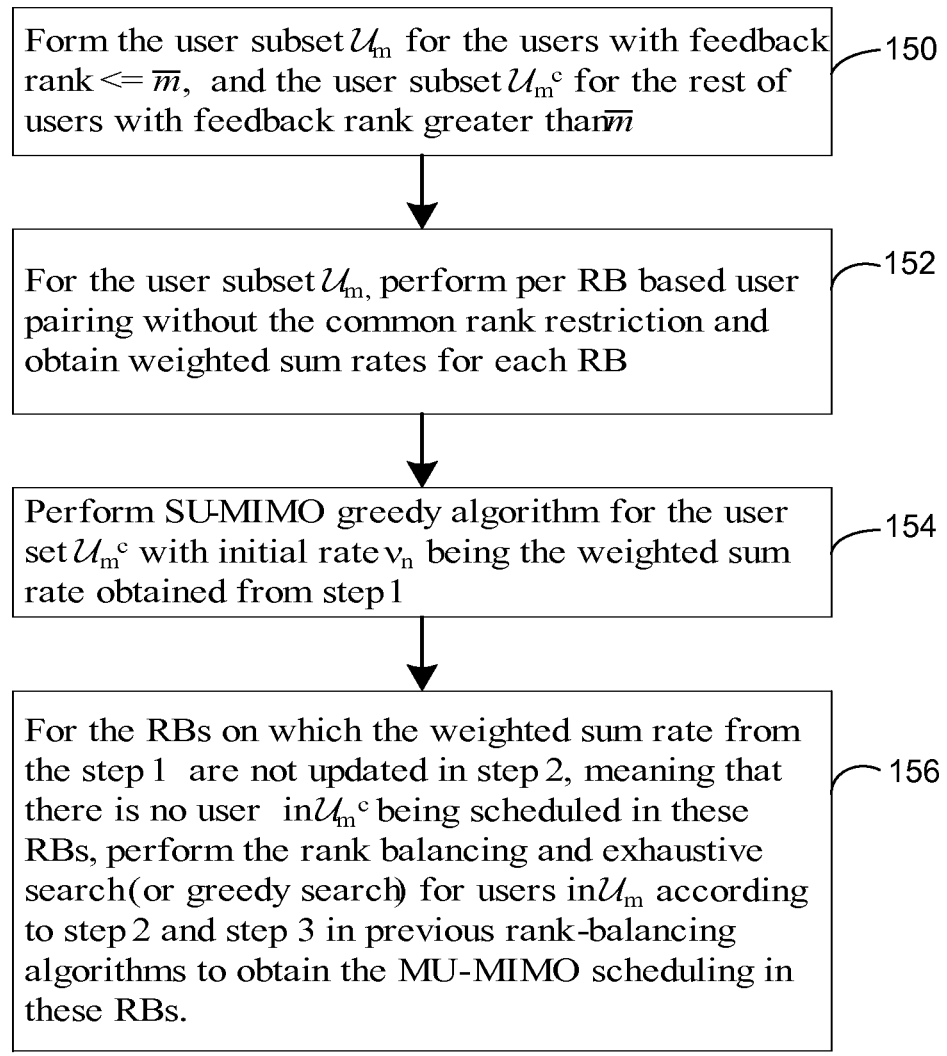
FIG. 6 is a flowchart of an embodiment of a rank balancing based MU-MIMO scheduling method for general user feedback.
Figure 7:
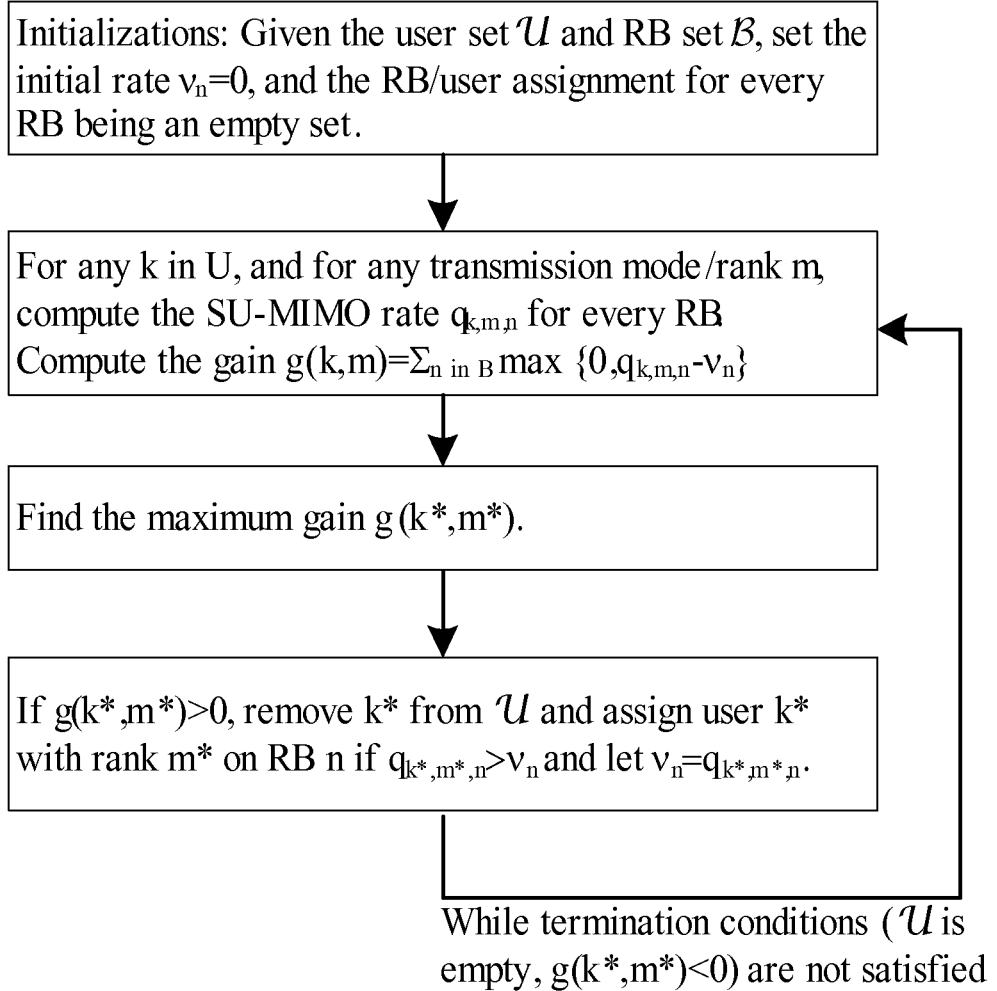
FIG. 7 is a flowchart of a prior art greedy single-user-MIMO scheduling method.

Referring now to the flowchart of FIG. 6 and initially to block 150, user set $U_m$ is formed for the users with feedback rank equal to or smaller than $\overline{m}$, and the user set $U_m^c$ for the remainder of users with feedback rank greater than $\overline{m}$. In block 152, for the user set $U_m$, per RB based user pairing is performed without the common rank restriction and obtain weighted sum rates for each RB.

In block 154, a SU-MIMO greedy method may be performed for users in the set $U_m^c$ with initial rate $v_n$ being the weighted sum rate obtained from block 152. In other embodiments, block 154 may comprise an RB based exhaustive search for SU-MIMO scheduling may be performed for user set $U_m^c$ with the transmission ranks being fixed as their feedback ranks for all RBs. The results are compared with the weighted sum rate obtained in block 152 for every RB and the scheduling results are updated, if the new rate result on RB n by scheduling the user in user set $U_m^c$, higher than the corresponding sum rate obtained from block 152. In still further embodiments, block 154 may comprise may comprise the performing of both the first and second options and then outputting the option result producing the higher overall weighted sum rate. The first option may comprise performing a SU-MIMO greedy method for the user set $U_m^c$ with initial rate $v_n$ being the weighted sum rate obtained from block 152. The second option may comprise performing per RB an exhaustive search for SU-MIMO scheduling for the user set $U_m^c$ with transmission ranks being fixed as their feedback ranks for all RBs. The results from block 154 are compared with the weighted sum rate obtained from block 152 for every RB and the scheduling results are updated, if the new rate result on RB n by scheduling the user in user set $U_m^c$, is higher than corresponding sum rate obtained from block 152.

In block 156, for the RBs in which the weighted sum rate from block 152 are not updated in block 154, meaning that there is no user in the set $U_m^c$ being scheduled in these RBs, rank balancing and exhaustive search (or greedy search) are performed for users in set $U_m$ accordance with the methods described previously with respect to FIGS. 3-5, to obtain the MU-MIMO scheduling in these RBs.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

Appendix A
Additional Information

Abstract

In this paper, we consider the resource allocation for downlink multiuser (MU) multi-input-multi-output (MIMO) transmissions at the base station for LTE advanced (LTE-A) cellular systems. Considering practical constraints, particularly, the common rank constraint, imposed by LTE-A standard, we present several scheduling methods which support dynamic change between single user (SU) MIMO and MU-MIMO transmissions along the frequency resource blocks (RB) in an OFDM air interface. We first present several MU-MIMO methods with rank restriction. Without rank restriction, the optimal solution is proved to be NP-hard. We then propose a rank-balancing method and show that the proposed rank balancing method based MU-MIMO scheduling algorithms are guaranteed to achieve a fraction of optimality. Simulation results demonstrate that the proposed rank balancing scheduling algorithms are more efficient and providing better performance than the other schemes for various system scenarios.

Key Words: Downlink, linear precoding, multiuser multi-input multi-output (MU-MIMO), orthogonal frequency-division multiplexing (OFDM), resource allocation, scheduling.

1 Introduction

The exponentially increasing data traffic over the cellular network has been witnessed as the usage of smartphones increases. To satisfy the demand of a higher data rate, the new cellular network according to 3GPP long term evolution (LTE) release-8 standard [1] has been deployed. Meanwhile, to further improve the cell throughput, several enhancements have been discussed and specified in 3GPP LTE standard release-10 [2] which is referred to as the LTE Advanced (LTE-A) system. One important enhancement in LTE-A is to support the downlink (DL) multiuser (MU) multi-input multi-output (MIMO) with linear precoding, which has been considered by many network operators as an important feature to further enhance system capacity. It has been shown that when perfect channel state information (CSI) is available at the base station, the linear transmit precoding performs very close to the capacity of MIMO broadcast channel achieved by dirty paper coding (DPC) [3]. Therefore, DL MU-MIMO with linear precoding can potentially offer significant throughput gain over the single user (SU) MIMO. Moreover, with the orthogonal frequency-division multiplexing (OFDM) as the air-interface for LTE and LTE-A, the dynamic change between SU-MIMO and MU-MIMO transmissions is supported in LTE-A systems even in the same transmission slot along different resource blocks (RB) in the frequency domain.

In this paper, we consider the design of DL MU-MIMO scheduling algorithm to achieve joint user pairing and resource allocation for LTE-A systems. The scheduling can be posed as an optimization problem to maximize the weighted sum rate over all RBs. However, the following practical constraints specified in the LTE and LTE-A standard cause difficulties to obtain the optimal solution for MU-MIMO scheduling.

- Common rank constraint: The precoding rank for a user should be uniform along all assigned RBs.

- For MU-MIMO, maximum 4 co-scheduled layers per RB is allowed and for each user, maximal number of co-scheduled layers is 2.

Due to above constraints, it is shown that finding the optimal solution for such scheduling problem becomes NP-hard. Thus well-performed suboptimal algorithms are essential to realize the MU-MIMO through gain and dynamic support of SU and MU-MIMO transmissions. Several MU-MIMO scheduling methods been proposed recently [4–7]. However, these existing methods consider the narrow band signal model thus the MU-MIMO scheduling becomes simply user pairing in a particular RB. The common rank constraint for wideband scenarios has not been taken into account in existing methods.

With these practical constraints, we present several MU-MIMO scheduling methods that can be implemented in the LTE-A systems. First, we present the scheduling methods with rank-1 restriction, meaning that the user only reports rank-1 preferred precoding matrix so that only rank-1 precoding and MU pairing can be employed at base station. With rank-1 restriction, the scheduling can be decoupled across RBs as the common rank constraint is naturally satisfied. Per RB optimal user pairing can be done with the exhaustive search. The sub-optimal greedy algorithm is presented as a low-complexity implementation. We also present an improved greedy algorithm using several parallel branches of greedy algorithm with different initial points. Although rank-1 restriction based MU-MIMO scheduling algorithms achieve dynamic SU/MU-MIMO scheduling with low-complexity and perform relatively well, it suffers performance degradation for SU-MIMO or when the number of users in the same serviced cell is small. Therefore, we propose a rank balancing MU-MIMO scheduling method to determine the user user rank which satisfied the rank constraints but without feedback rank restriction. We then present several rank balancing based MU-MIMO scheduling algorithms for various scenarios. We analytically show that the proposed rank balancing algorithms are guaranteed to achieve a fraction approximation of the optimal solution. All presented scheduling methods are evaluated via computer simulations. The results show that the proposed rank balancing method is more efficient and perform better than other schemes in various channel scenarios and antenna settings.

The remainder of this paper is organized as follows. In Section 2, we introduce the system model of DL MU-MIMO and SU-MIMO. In Section 3, we summarize the MU-MIMO scheduling into an optimization problem and present the SU-MIMO scheduling. In Section 4, we present the details of existing and proposed MU-MIMO scheduling algorithms. Simulation results are provided in Section 5. Section 6 contains the conclusions.

2 System Model

We consider a wideband MU-MIMO signal model at a user terminal of interest in the aftermath of scheduling. Assume that the base station has $M_t$ transmit antennas and each serviced user is equipped with $M_r$ receive antennas. Also assume that there are $K$ active users in the service cell and total $N$ RBs[1] to be assigned for either SU or MU-MIMO transmissions. The received discrete

---

[1] Each RB consists of a certain number of adjacent subcarriers. In LTE and LTE-A, one RB contains twelve adjacent subcarriers in the frequency domain. We assume that the channel is constant within a RB. The channel feedback granularity can be subband basis where each subband contain one or more RBs. The user pairing and resource allocation is then performed for each subband.

signal vector at the $k$th user and the $n$th RB is given by $$y_{k,n} = H_{k,n} x_n + \eta_{k,n}, \quad k = 1, \cdots, K, \; n = 1, \cdots, N, \qquad (1)$$

where $H_{k,n} \in \mathcal{C}^{M_r \times M_t}$ is the channel matrix for the $k$th user at the $n$th RB and $\eta_{k,n} \sim \mathcal{CN}(0, I)$ is the additive noise. The signal vector $x_n$ transmitted by the base station can be expanded as $$x_n = \sum_{k \in \mathcal{U}^{(n)}} V_{k,n} s_{k,n} \qquad (2)$$

where $\mathcal{U}^{(n)}$ is the set of co-scheduled users at the $n$th RB, $V_{k,n}$ is the $M_t \times r_k$ precoding matrix used to transmit to the $k$th user on the $n$th RB, with unit-norm columns and rank $r_k$, i.e., $V_{k,n} = [v_{1,k,n}, \cdots, v_{r_k,k,n}]$ with $\|v_{i,k,n}\|^2 = 1 \; \forall i$, and $s_{k,n}$ is the $r_k \times 1$ symbol vector corresponding to user $k$ on the $n$th RB and $k \in \mathcal{U}^{(n)}$. Further, let $S_n = \sum_{k \in \mathcal{U}^{(n)}} r_k$ be the total number of co-scheduled streams or total rank. The total power for all streams is $\rho$. If we assume equal power allocation, the power per stream is then given by $\rho' = \frac{\rho}{S_n}$.

Suppose that the base station considers co-scheduling $Q_n$ users in RB $n$, i.e., $|\mathcal{U}^{(n)}| = Q_n$. Define $A_n \triangleq \sqrt{\rho'}[V_{k,n}]_{k \in \mathcal{U}^{(n)}}$ as the overall precoding matrix for MU-MIMO transmissions. Assuming linear MMSE receiver, the signal-to-interference plus noise ratio (SINR) for the $i$th stream of the $k$th user at the $n$th RB can be computed by $$\gamma_{i,k,n} = \frac{\alpha_{i,k,n}}{1 - \alpha_{i,k,n}}, \qquad (3)$$

with $$\alpha_{i,k,n} = \rho' v_{i,k,n} H_{k,n}^\dagger (I + H_{k,n} A_n A_n^\dagger H_{k,n}^\dagger)^{-1} H_{k,n} v_{i,k,n}, \quad i = 1, \cdots, r_k \qquad (4)$$

where $\dagger$ denotes the matrix Hermitian. With matrix inverse lemma, we can rewrite $\alpha_{i,j,n}$ as $$\alpha_{i,k,n} = \left[(I + A_n^\dagger S_{k,n} A_n)^{-1} A_n^\dagger S_{k,n} A_n\right]_{e_k+i, e_k+i}, \quad i = 1, \cdots, r_k, \qquad (5)$$

where $S_{k,n} = H_{k,n}^\dagger H_{k,n}$, $[\cdot]_{m,n}$ denotes the entry of a matrix at the $m$th row and the $n$th column, and the columns of $A_n$ between indices $e_k + 1, \cdots, e_k + r_k$ form $\sqrt{\rho'} V_{k,n}$. Denote $\hat{G}_{k,n}$ as the reported precoder from user $k$ with the rank $\hat{r}_k$ with the corresponding quantized SINRs $\{\hat{\gamma}_{i,k,n}\}_{i=1}^{\hat{r}_k}$ as the channel quality indexes (CQIs). Define $\hat{D}_{k,n} = \frac{\hat{r}_k}{\rho} \text{diag}\{\hat{\gamma}_{1,k,n}, \cdots, \hat{\gamma}_{\hat{r}_k,k,n}\}$. If the exact channel state information (CSI) is not available at the base station, $S_{k,n}$ can be approximated as $$S_{k,n} \approx \hat{S}_{k,n} \triangleq \hat{G}_{k,n} \hat{D}_{k,n} \hat{G}_{k,n}^\dagger. \qquad (6)$$

The corresponding information rate is then given by $$\eta_{i,k,n} = \log(1 + \gamma_{i,k,n}). \qquad (7)$$

The weighted sum rate for co-scheduled users on the $n$th RB is then given by $$\xi(\mathcal{U}^{(n)}, r^{(n)}) = \sum_{k \in \mathcal{U}^{(n)}} w_k \sum_{i=1}^{r_k^{(n)}} \eta_{i,k,n}, \qquad (8)$$

where $r^{(n)} = [r_1^{(n)}, \cdots, r_K^{(n)}]$ with $r_k^{(n)} = r_k$ if $k \in \mathcal{U}^{(n)}$, and $r_k^{(n)} = 0$, otherwise, and $w_k$ denotes the weight of user $k$. For proportional fair scheduling, $w_k$ is the reciprocal of the average rate of user $k$. As we can see that $\eta_{i,k,n}$ is also determined by co-scheduled users as well as the transmission rank of each user in the pairing set. Thus it is also a function of $\mathcal{U}^{(n)}$ and $r(n)$, i.e., $\eta_{i,k,n}(\mathcal{U}^{(n)}, r^{(n)})$. Given $\mathcal{U}^{(n)}$ and $r^{(n)}$, we also define the weighted rate of each user on RB $n$ as $\xi_k(\mathcal{U}^{(n)}, r^{(n)}) = w_k \sum_{i=1}^{r_k^{(n)}} \eta_{i,k,n}$. Again if $k \notin \mathcal{U}^{(n)}$, we have $\xi_k(\mathcal{U}^{(n)}, r^{(n)}) = 0$.

2.1 Zero Forcing (ZF) precoding

We consider user pairing subject to near-orthogonality constraint. Denote $\hat{V}_{k,n}$ as the initial precoding matrix for user $k$ to be transmitted which is formed by $\hat{G}_{k,n}$ or a subset of columns of $\hat{G}_{k,n}$. If they are not orthogonal to each other, i.e., $\hat{V}_{k,n}^\dagger \hat{V}_{k',n} \neq 0$, for $k \neq k'$, $k, k' \in \mathcal{U}^{(n)}$. We can apply ZF precoding to reduce the interference from co-scheduled users. With $\hat{A}_n \triangleq [\hat{V}_{k,n}]_{k \in \mathcal{U}^{(n)}}$, we first obtain $$\tilde{A}_n = \hat{A}_n (\hat{A}_n^\dagger \hat{A}_n)^{-1}. \qquad (9)$$

Form $\tilde{A}_n = [\tilde{V}_{k,n}]_{k \in \mathcal{U}^{(n)}}$ with the same column order for $k \in \mathcal{U}^{(n)}$ as in $\hat{A}_n$ and $\tilde{V}_{k,n} = [\tilde{v}_{1,k,n}, \cdots, \tilde{v}_{r_k,k,n}]$. With the column-wise normalization of $\tilde{A}_n$, we then obtain the transmit precoder that the base station eventually employs for the user $k$, $V_{k,n} = [v_{1,k,n}, \cdots, v_{r_k,k,n}]$ with unit norm for each column, i.e., $v_{i,k,n} = \tilde{v}_{i,k,n}/\|\tilde{v}_{i,k,n}\|$.

2.2 SU-MIMO Signal Model

If for any RB, only the data symbols to one user are transmitted, i.e., $|\mathcal{U}^{(n)}| = 1$, we then have a SU-MIMO transmission. Thus the transmitted signal vector $x_n$ is simply the precoded QAM symbol vector to one user, i.e., $x_n = V_{k,n} s_{k,n}$, $\mathcal{U}^{(n)} = \{k\}$, the received signal at the $k$th user terminal is then given by $$y_{k,n} = H_{k,n} V_{k,n} s_{k,n} + \eta_{k,n}. \qquad (10)$$

The rate of the $i$th layer is then given by $$\eta_{i,k,n}^{\text{su}} = \log\left(1 + \gamma_{i,k,n}^{\text{su}}(V_{k,n}, H_{k,n})\right), \qquad (11)$$

where the MMSE receiver SINR $\gamma_{i,k,n}^{\mathrm{su}}$ is obtained as $$\gamma_{i,k,n}^{\mathrm{su}}(V_{k,n}, H_{k,n}) = \frac{\alpha_{i,k,n}^{\mathrm{su}}}{1 - \alpha_{i,k,n}^{\mathrm{su}}}$$

$$\text{and} \quad \alpha_{i,k,n}^{\mathrm{su}} = \rho' v_{i,k,n}^{\dagger} H_k^{\dagger} (I + \rho' H_{k,n} V_{k,n} V_{k,n}^{\dagger} H_{k,n}^{\dagger})^{-1} H_{k,n} v_{i,k,n}. \tag{12}$$

The sum-rate with rank $r_k^{(n)}$ is then given by $$\zeta_{k,n}(r_k^{(n)}) = \sum_{i=1}^{r_k^{(n)}} \eta_{i,k,n}^{\mathrm{su}}, \quad k \in \mathcal{U}^{(n)}. \tag{13}$$

3 Wideband MU-MIMO Scheduling in LTE-A

3.1 General Descriptions

We now consider the MU-MIMO scheduling, i.e., joint user pairing and resource allocation, in a wideband MIMO-OFDM system with $N$ RBs. The scheduling is to find the user pairing and resource allocations which maximize an objective utility function. We consider the weighted sum rate as the objective function. Denote $\mathcal{B}$ as the set of RBs that are available for scheduling, where $\mathcal{B} \subseteq \{1, \cdots, N\}$. Defining $\zeta_{k,n} = 0$ for $k \notin \mathcal{U}^{(n)}$, the MU-MIMO scheduling problem can be summarized as $$\max_{\{\mathcal{U}^{(n)}, r^{(n)}\}_{n=1}^{N}} \sum_{n \in \mathcal{B}} \xi(\mathcal{U}^{(n)}, r^{(n)}). \tag{14}$$

As aforementioned, several practical constraints are imposed for MU-MIMO transmissions. For example, according to the LTE-A standard, up-to-4 layers can be co-scheduled in an RB and up-to-2 layers can be scheduled for each user if the RB is scheduled for MU-MIMO transmissions. Another important constraint which makes the scheduling problem in (14) more complex is the common rank constraint, i.e., the number of layers scheduled for a user should be uniform along all allocated RBs to this user at one time instance. Additional if any user has channel feedback with preferred precoding matrix of rank $\hat{r}_k > 2$, only SU-MIMO is employed for this user's data transmissions.[2] Taking into account all these constraints, the optimization in (14) is then rewritten ---
[2]This constraint is motivated by the poor quantization of the first two dominant right singular vectors of the channel matrix by the higher rank user reported precoding matrix.

as $$\max_{\{\mathcal{U}^{(n)}, r^{(n)}\}_{n=1}^N} \sum_{n \in \mathcal{B}} \xi(\mathcal{U}^{(n)}, r^{(n)}),$$

$$\text{s.t.} \quad \begin{cases} \sum_{k \in \mathcal{U}^{(n)}} r_k^{(n)} \leq \bar{M} \\ \|r^{(n)}\|_\infty \leq \bar{m} \\ \mathcal{U}^{(n)} \cap \widetilde{\mathcal{U}}^c = \emptyset \end{cases}, \quad \forall |\mathcal{U}^{(n)}| \geq 2, \quad (15)$$

$$r_k^{(n)} = r_k^{(m)}, \text{ if } k \in \mathcal{U}^{(n)} \cap \mathcal{U}^{(m)}, \forall n \neq m, \quad (16)$$

where $\bar{M}$ and $\bar{m}$ are the maximum number of co-scheduled layers and the maximum number of layers for each co-scheduled user with MU transmissions on an RB, respectively, and $\widetilde{\mathcal{U}}$ denotes the set of users with feedback rank less than or equal to $\bar{m}$ and $\widetilde{\mathcal{U}}^c$ denotes its complementary set. Obviously, we have $\bar{M} = 4$ and $\bar{m} = 2$ for LTE-A systems.

It can be shown that finding the optimal solution to the resulting scheduling problem in (16) is NP-hard. It is also infeasible to perform an exhaustive search from all possible combinations even when the values of $K$, $L$, $N$ and $\bar{M}$ are not very large. In this paper, we first present several methods which solve a more constrained scheduling problem. Then we re-formulate the scheduling problem and develop suboptimal scheduling algorithms based on a novel rank balancing method. We show that the proposed suboptimal solutions achieve at least a constant fraction approximation of the optimal solution.

3.2 SU-MIMO Scheduling

Before presenting the MU-MIMO scheduling, we first recapitulate the scheduling algorithm for SU-MIMO in LTE or LTE-A systems proposed in [8,9].

It is seen that the SU-MIMO is a special case of MU-MIMO transmission with $|\mathcal{U}^{(n)}| = 1$. Therefore, some constraints in (16) for MU pairing can be removed. To incorporate the common rank constraint, a two tuple element $(k, m)$ is defined which represents a transmission mode for user $k$ with rank $m$ along all RBs, i.e., $r_k^{(n)} = m$, $\forall n$. Introducing an indicator function defined as $\chi_{k,m,n} = 1$ if $k \in \mathcal{U}_n$ and $r_k^{(n)} = m$, otherwise $\chi_{k,m,n} = 0$, the general MU-MIMO scheduling problem summarized in (16) can then be revised for SU-MIMO scheduling, given by $$\max \sum_{n \in B} \sum_{k=1}^{K} \sum_{m=1}^{\tilde{M}} w_k \zeta_{k,n}(m) \chi_{k,m,n},$$

$$\text{s.t.} \sum_{m=1}^{\tilde{M}} \max_{n=1}^{N} \chi_{k,m,n} \leq 1, \quad 1 \leq k \leq K$$

$$\sum_{m=1}^{\tilde{M}} \sum_{k=1}^{K} \chi_{k,n,m} = 1, \quad 1 \leq n \leq N. \tag{17}$$

It is seen that from (17) that a maximum rank $\tilde{M}$ upper bound is applied for every user. Practically the transmission rank for each user is no greater than its reported rank. This can be easily taken care of by letting $\tilde{M} \geq \max_k\{\hat{r}_k\}$ and setting $\zeta_{k,n}(m) = 0$ for $m > \hat{r}_k$ for all $k$.

Although the optimization problem form SU-MIMO in (17) is much simpler than the MU-MIMO optimization in (16), it is can be shown that finding the optimal solution is still NP-hard. A sub-optimal greedy algorithm is then proposed in [8,9]. It is seen that the greedy algorithm can achieve $\frac{1}{2}$-approximation of the global optimal solution due to the submodularity condition.

The aim of the SU-MIMO scheduling algorithm is to find the set of scheduled users, the transmission mode and a set of allocated RBs for each user, i.e., the optimal $\{\chi_{k,m,n}\}$ which maximizes the weighted sum rate. The SU-MIMO greedy algorithm can be briefly described as follows. Denote $\nu_n$ as the weighted rate on the $n$th RB based on the allocation in current iteration and define the weighted rate $q_{k,m,n} \triangleq w_k \zeta_{k,n}(m)$. Initially set $\mathcal{U} = \{1, \cdots, K\}$ and $v_n = 0$, $\forall n$ and compute the user rate $\zeta_{k,n}(m)$ for all users $k \in \mathcal{U}$ on each RB $n$ for each transmission rank $m$. At each iteration, we compute the gain of scheduling user $k$ with transmission mode $m$, given by $$g(k, m) = \sum_{n \in B} \max\{0, q_{k,m,n} - \nu_n\}. \tag{18}$$

We next find the optimal $(u, m)$ that maximizes $g(k, m)$, i.e., $(k^*, m^*)$. For each RB $n$, if $q_{k^*,m^*,n} > \nu_n$ we then allocate RB $n$ to user $k^*$ and remove its previous allocation. We then update $\nu_n$ by $\nu_n = q_{k^*,m^*,n}$. The algorithm terminates when $\mathcal{U} = \emptyset$, or $g(u^*, m^*) \leq 0$. Assume all $N$ RBs are available for scheduling, the detailed algorithm is summarized in Algorithm 1.

4  MU-MIMO Scheduling Methods

Similarly as SU-MIMO scheduling, we can also find the user pairing and resource allocation for MU-MIMO in a greedy fashion. However, as seen from (3) and (4), the rate for a particular user scheduled on an RB decreases when an additional user is co-scheduled on this RB. In addition

Algorithm 1 Greedy SU-MIMO scheduling algorithm.

1: Initially set $\mathcal{B} = \{1, \cdots, N\}$, $\mathcal{U} = \{1, \cdots, K\}$, $\nu_n = 0$ for $1 \leq n \leq N$, and $\chi_{k,m,n} = 0$ for all $k, n$, and $m$. Compute all $\{q_{k,m,n}\}$.
2: while Termination conditions are not satisfied do
3:     for all $k \in \mathcal{U}$ do
4:         for $m = 1, \cdots, \tilde{M}$ do
5:             Compute the gain $g(k, m)$.
6:         end for
7:     end for
8:     Obtain $(k^*, m^*) = \arg\max_{k \in \mathcal{U}, 1 \leq m \leq \tilde{M}} g(k, m)$.
9:     if $g(k^*, m^*) > 0$ then
10:        Let $\mathcal{U} = \mathcal{U} \setminus k^*$.
11:        for any $n \in \mathcal{B}$ do
12:            if $q_{k^*,m^*,n} > \nu_n$ then
13:                Let $\chi_{k^*,m^*,n} = 1$ and set $\chi_{k,m,n} = 0$, $\forall k \neq k^*$, $\forall m$.
14:                Let $\nu_n = q_{k^*,m^*,n}$.
15:            end if
16:        end for
17:     end if
18: end while the sub-modularity property for SU-MIMO described in [8] is not satisfied for MU-MIMO. Thud, the greedy algorithm extended from Algorithm 1 for MU-MIMO does not have any guarantee to achieve a certain optimality. In this section, we provide several MU-MIMO scheduling algorithms. For some of them we can show that they also achieve a constant approximation of the optimal solution.

4.1 Scheduling with Rank Restriction

We can see that the scheduling with dynamic switch between SU and MU-MIMO is complex mostly due to the common rank constraint. Under rank restriction, i.e., the transmission rank is fixed for every user prior to scheduling, so that the common rank constraint is then naturally satisfied. So we first present the scheduling algorithms with rank restriction. Then we present several scheduling algorithms considering dynamic transmission rank setting for each user (i.e., without a prior rank restriction). Here we consider the rank-1 restriction for MU-MIMO transmissions, i.e., the transmission rank of each allocated user is set to be one no matter which rank is reported from the user. With this rank restriction, the common rank constraint is vacuous so that the scheduling can be decoupled and reduced to the narrow band user pairing problem which can be performed independently for each RB. Since the exhaustive search is feasible for every RB, the optimal solution can be obtained.

4.1.1 Exhaustive Search Algorithm

The optimal algorithm for MU-MIMO scheduling with rank-1 restriction is the per-RB exhaustive search over all possible user pairings subject to constraints on the maximum number of paired users. Given $K$ candidate users, total number of combinations for user pairing on each RB is then $\sum_{l=1}^{\bar{M}} \binom{K}{l}$. If the feedback rank $\hat{r}_k = 1$ is imposed on the user feedback, the user reported preferred rank-1 precoding vector can be directly employed for MU-MIMO pairing. The total number of options for pairing is still $\sum_{l=1}^{\bar{M}} \binom{K}{l}$. The rank-1 transmit precoding vector for user $k$ is then $v_k = \hat{g}_k$, where $\hat{g}_k$ is its reported vector, or obtained from ZF beamforming according to the description in Sec. 2. On the other hand, if a user is free to report the best rank based the channel seen by the user, when the reported rank $\hat{r}_k > 1$ the precoding vector $v_k$ for a user $k$ can be formed from any column in its preferred precoding matrix $\hat{G}_k$ each of which is a candidate for evaluation. Thus given a candidate user pairing set $\mathcal{A} \subseteq \{1, \cdots, K\}$ the total number of combinations for column selections is $\prod_{k \in \mathcal{A}} \hat{r}_k$ with rank-1 user pairing restriction. We can extend it to the general case with user rank restriction, i.e., the rank of user $k$ is fixed prior to scheduling to be $r_k$, $r_k \leq \hat{r}_k$. Therefore, the total number of combinations for column selections is then given by $\prod_{k \in \mathcal{A}} \binom{\hat{r}_k}{r_k}$. Given a user set $\mathcal{A}$ and a rank selection set $\boldsymbol{d} = [d_1, \cdots, d_K]$, we then define $\mathcal{I}_{\mathcal{A},\boldsymbol{d}} \triangleq \{\pi_k \subseteq \{1, \cdots, \hat{r}_k\} | |\pi_k| = d_k\}_{k \in \mathcal{A}}$ as a valid option for column selection to form the precoding matrix for the candidate user set $\mathcal{A}$ with $d_k$ columns selected from the preferred matrix $\hat{\boldsymbol{G}}_k$ for user $k$. For example, given $\mathcal{I}_{\mathcal{A},\boldsymbol{d}}$, precoding vectors $\{\boldsymbol{V}_k\}$ are formed by $\{[\hat{\boldsymbol{g}}_{\pi_k(1),k}, \cdots, \hat{\boldsymbol{g}}_{\pi_k(d_k),k}]\}_{k \in \mathcal{A}}$ (with or without zero-forcing). The weighted sum rate is then $\xi(\mathcal{A}, \boldsymbol{d}, \mathcal{I}_{\mathcal{A},\boldsymbol{d}})$. For rank-1 restriction, we have $d_k = 1$ for $k \in \mathcal{A}$. Or given any arbitrary determined rank vector $\boldsymbol{r}^* = [r_1^*, \cdots, r_k^*]$, $\boldsymbol{d}$ is then also a function of $\boldsymbol{r}^*$, $\boldsymbol{d}(\boldsymbol{r}^*)$ for emphasis, with $d_k = r_k^*$ if $k \in \mathcal{A}$ or $d_k = 0$ if $k \notin \mathcal{A}$.

In this paper we consider MU-MIMO user pairing subject to a near orthogonality constraint, i.e., the cross correlation of any two precoding vectors belonging to any two paired users (prior to zero-forcing) should be smaller than a given threshold $\epsilon$. Given any $\mathcal{A}$ and $\boldsymbol{d}$, define $$c_{\max}(\mathcal{A}, \boldsymbol{d}, \mathcal{I}_{\mathcal{A},\boldsymbol{d}}) = \max_{\{i_1 \leq d_{k_1}, i_2 \leq d_{k_2}, k_1, k_2 \in \mathcal{A}, k_1 \neq k_2\}} |\boldsymbol{v}_{i_1,k_1}^\dagger \boldsymbol{v}_{i_2,k_2}|. \tag{19}$$

We then impose that $c_{\max}(\mathcal{A}, \boldsymbol{d}, \mathcal{I}_{\mathcal{A},\boldsymbol{d}}) \leq \epsilon$.

The exhaustive search algorithm for MU-MIMO scheduling with rank-1 restriction is summarized in Algorithm 2.

---

Algorithm 2 Optimal MU-MIMO scheduling algorithm with rank restriction

1: Initialize the RB set $\mathcal{B} = \{1, \cdots, N\}$, user set $\mathcal{U} = \{1, \cdots, K\}$, and $\boldsymbol{r}^* = 1$.
2: for each RB $n \in \mathcal{B}$ do
3:     for each $\mathcal{A} \subseteq \mathcal{U}$ with $|\mathcal{A}| \leq \bar{M}$ and each $\mathcal{I}_{\mathcal{A},\boldsymbol{d}(\boldsymbol{r}^*)}$ do
4:         Compute $c_{\max}(\mathcal{A}, \boldsymbol{d}(\boldsymbol{r}^*), \mathcal{I}_{\mathcal{A},\boldsymbol{d}(\boldsymbol{r}^*)})$.
5:         If $c_{\max}(\mathcal{A}, \boldsymbol{d}(\boldsymbol{r}^*), \mathcal{I}_{\mathcal{A},\boldsymbol{d}(\boldsymbol{r}^*)}) \leq \epsilon$, compute the weighted sum rate $\xi(\mathcal{A}, \boldsymbol{d}(\boldsymbol{r}^*), \mathcal{I}_{\mathcal{A},\boldsymbol{d}(\boldsymbol{r}^*)})$. Otherwise set $\xi(\mathcal{A}, \boldsymbol{d}(\boldsymbol{r}^*), \mathcal{I}_{\mathcal{A},\boldsymbol{d}(\boldsymbol{r}^*)}) = 0$.
6:     end for
7:     Find $(\mathcal{A}^*, \mathcal{I}_{\mathcal{A}^*,\boldsymbol{d}(\boldsymbol{r}^*)}) = \arg\max_{\mathcal{A},\mathcal{I}_{\mathcal{A},\boldsymbol{d}(\boldsymbol{r}^*)}} \xi(\mathcal{A}, \boldsymbol{d}(\boldsymbol{r}^*), \mathcal{I}_{\mathcal{A},\boldsymbol{d}(\boldsymbol{r}^*)})$.
8:     Output $\mathcal{U}^{(n)} = \mathcal{A}^*$, $\mathcal{I}^{(n)} = \mathcal{I}_{\mathcal{A}^*,\boldsymbol{d}(\boldsymbol{r}^*)}$, and the final weighted sum rate for RB $n$ $\xi(\mathcal{U}^{(n)}, \boldsymbol{d}(\boldsymbol{r}^*), \mathcal{I}^{(n)})$.
9: end for

---

4.1.2 Greedy Algorithm

For fast implementation in the practical system, a low-complexity iterative greedy algorithm can be employed as in Algorithm 3. Here if the preferred rank $\hat{r}_k > 1$, the column corresponding to the highest SINR in the reported precoding matrix $\hat{\boldsymbol{G}}_k$ is selected for greedy scheduling. Therefore, for notation simplicity, we can drop the column index set from the notation of weighted sum rate.

It is straightforward to extend Algorithm 3 to the case considering different column selection for greedy algorithm as in the exhaustive search algorithm.

---
Algorithm 3 Greedy MU-MIMO scheduling algorithm with rank-1 restriction
---
1: Initialize the RB set $\mathcal{B} = \{1, \cdots, N\}$ and $r^* = 1$.
2: for each RB $n \in \mathcal{B}$ do
3:    Set $\mathcal{U} = \{1, \cdots, K\}$, $\mathcal{A} = \emptyset$, and $\xi(\emptyset, d(r^*)) = 0$.
4:    repeat
5:      $\mathcal{U}' = \emptyset$ and $k^* = \emptyset$.
6:      for each user $k \in \mathcal{U}$ do
7:        Set $g(k, n) = 0$ and $\mathcal{A}_k = \mathcal{A} \cup \{k\}$
8:        if $c_{\max}(\mathcal{A}_k, d(r^*)) \leq \epsilon$ then
9:          Update $\mathcal{U}' \leftarrow \mathcal{U}' \cup \{k\}$.
10:         Obtain the pairing gain $g(k, n) = \max\{0, \xi(\mathcal{A}_k, d(r^*)) - \xi(\mathcal{A}, d(r^*))\}$.
11:        end if
12:      end for
13:      Find $k^* = \arg\max_{k \in \mathcal{U}', g(k,n) > 0} g(k, n)$ and $\mathcal{A} \leftarrow \mathcal{A} \cup \{k^*\}$.
14:      Set $\mathcal{U} = \mathcal{U}' \setminus k^*$.
15:    until $\mathcal{U} = \emptyset$ or $k^* = \emptyset$ or $|\mathcal{A}| = \bar{M}$.
16:    Output: $\mathcal{U}^{(n)} = \mathcal{A}$ is the set of scheduled users for RB $n$ and final weighted sum rate $\xi(\mathcal{U}^{(n)}, d(r^*))$.
17: end for
---

4.1.3 Improved Greedy Algorithm

It is known that the greedy algorithm adds the user to the pairing set along one direction of the search space. We now consider a simple improved method for greedy algorithm in which $T$ branches of greedy user pairing processes with different initial settings are executed in parallel for each RB. Consequently $T$ user pairing results are obtained. We select the one with the highest weighted sum rate as the final scheduling output for this RB. To obtain $T$ initial settings, we first compute the rate of SU-MIMO with rank-1 restriction for each user. We then sort the users based on the user rates in their descending order and find the first $T$ users with different precoding vectors. The improved greedy algorithm for MU-MIMO scheduling with rank-1 restriction is presented in Algorithm 4.

Algorithm 4 Improved greedy MU-MIMO scheduling algorithm with rank-1 restriction 1: Initialize the RB set $\mathcal{B} = \{1, \cdots, N\}$ and $r^* = 1$.
2: for each RB $n \in \mathcal{B}$ do
3:     Compute $\xi(\{k\}, e_k)$ for $k = 1, \cdots, K$, where $e_k$ is a length-$K$ unit vector with the $k$th entry being one and other entries being zero.
4:     Sort $\xi(\{k\}, e_k)$ in a descend order which results in a new user order $\mathcal{T}(k)$.
5:     Set $\tilde{\mathcal{A}} = \emptyset$, $k' = 1$. While $|\tilde{\mathcal{A}}| < T$ or $k' < K$, if $v^\dagger_{\mathcal{T}^{-1}(k')} v_j \neq 1, \forall j \in \tilde{\mathcal{A}}$, let $\tilde{\mathcal{A}} \leftarrow \tilde{\mathcal{A}} \cup \mathcal{T}^{-1}(k')$, otherwise let $k' \leftarrow k' + 1$.
6:     for each $k_t \in \tilde{\mathcal{A}}$ do
7:         Set $\mathcal{U} = \{1, \cdots, K\} \setminus k_t$ and $\mathcal{A} = \{k_t\}$.
8:         Perform greedy algorithm as described in Algorithm 3, step 4 to 15, and obtain the final pairing set $\tilde{\mathcal{A}}_{k_t}$
9:     end for
10:    Find $\mathcal{A}^* = \arg\max_{\tilde{\mathcal{A}}_{k_t}} \xi(\tilde{\mathcal{A}}_{k_t}, d(r^*))$
11:    Output $\mathcal{U}^{(n)} = \mathcal{A}^*$.
12: end for

4.2 Scheduling with Dynamic Rank Setting

We now present several MU-MIMO scheduling methods without initial rank restriction. The user rank is fully determined by the scheduler. We present the following novel MU-MIMO scheduling algorithms and particularly propose the rank balancing based MU-MIMO scheduling methods as they provide superior performance and can be proved to have a certain performance guarantee.

4.2.1 Iterative Algorithm with Stochastic Update

We first present an iterative user pairing and rank selection method with stochastic update. The idea is originally proposed for coordinated power control in a multi-cell system [10]. It can be applied to single cell MU-MIMO scheduling by treating the single base station in a MU-MIMO transmission as multiple virtual base stations as in a multi-cell system and each co-scheduled user is then served by a virtual base station. The basic idea is described as follows.

- In each iteration:
  (1) Suppose that the scheduling results in the previous iteration consists of overall weighted sum-rate $J$ and for each RB $n$: $\mathcal{U}^{(n)}$ and $r^{(n)}$ along with the column selections $\mathcal{I}^{(n)}_{\mathcal{U}^{(n)}, r^{(n)}}$. For each user, e.g., user $k$, we first fix the scheduling decisions made for all other users at the end of the previous iteration. Then on each RB $n$ we compute the weighted sum rate without user $k$ co-scheduled and also the weighted sum rate with user $k$ co-scheduled as rank $m$ (with the best column selection corresponding to rank $m$ which achieves the largest weighted sum rate on RB $n$). We obtain all such weighted sum rates for all ranks $m$ on all RBs. The local scheduling results for user $k$ of rank $m^*$ is then obtained where $m^*$ is the rank which maximizes the weighted sum-rate over all RBs, the latter denoted by $V_{m^*}$.

(2) If $V_{m^*} > J$, we generate a random number $\varpi \in [0,1)$. If $\varpi$ is smaller than a predetermined threshold $\epsilon_u$, we then update the scheduling results of user $k$ with its local scheduling results for all RBs.

(3) Repeat step (1)-(2) (in parallel) for all $k = 1, \cdots, K$.

The details are summarized in Algorithm 5. For convenience we have assumed that $\tilde{M} = barm$, where $\tilde{M}$ is the maximum possible user transmission rank when it is scheduled alone on any RB.

4.2.2 Greedy with SU-MIMO Rank Fixing

The basic idea of this approach is to use the SU-MIMO greedy algorithm to determine user rank, then perform MU-MIMO scheduling with per RB based user pairing. The algorithm is summarized as follows.

(1) Perform SU-MIMO scheduling following Algorithm 1 and obtain the resource allocations and $\chi_{k,m,n}$.

(2) Obtain the user rank $r^*$ with $r_k^* = \sum_{m=1}^{\tilde{M}} m \max_{n=1}^{N} \chi_{k,m,n}$ if $k \in \bigcup_n \mathcal{U}^{(n)}$ and $r_k^* = 1$ for $k \notin \bigcup_n \mathcal{U}^{(n)}$.

(3) With the fixed rank $r^*$, perform MU-MIMO scheduling in a decoupled manner for each RB following one of algorithms in Sec. 4.1, i.e., Algorithm 2, 3, or 4. Clearly we have $r_k^* \leq \tilde{M}$, $\forall k$. For any user $k$ with $r_k^* > \bar{m}$ no pairing is possible and it can only be scheduled alone on an RB with $r_k^*$.

4.2.3 Rank Balancing

We now propose a novel rank balancing method to determine user rank for the dynamic SU and MU-MIMO scheduling. We present several rank balancing based scheduling algorithms. The first one consists of the following three steps. We assume $\tilde{M} = \bar{m}$, where $\tilde{M}$ is the maximum possible user transmission rank when it is scheduled alone on any RB. Note that in all the algorithms described

Algorithm 5 Iterative MU-MIMO scheduling algorithm with stochastic update

1: Initializations: set maximum number of iterations $\ell'$, updating threshold $\epsilon_u$, $\mathcal{B} = \{1, \cdots, N\}$, $\mathcal{U} = \{1, \cdots, K\}$, initial scheduling results for RB $n$, $\mathcal{U}^{(n)} = \emptyset$, $r^* = 0$, $r^{(n)} = 0$ $\forall n \in \mathcal{B}$, $\mathcal{I}^{(n)}_{\mathcal{U}^{(n)}, r^{(n)}} = \emptyset$, and the initial weighted sum-rate $J = 0$ over all $n \in \mathcal{B}$.
2: for $\ell = 1, \cdots, \ell'$ do
3:     Let $\mathcal{U}'^{(n)} = \emptyset$, $r'^{(n)} = 0$, $\mathcal{I}'^{(n)} = \emptyset$, $\forall n \in \mathcal{B}$.
4:     for each $k \in \mathcal{U}$ do
5:         Let $b_{m,n} = 0$ for each $n \in \mathcal{B}$, $m = 1, \cdots, \bar{m}$.
6:         for each $n \in \mathcal{B}$ do
7:             Let $\kappa = 0$, $\bar{\kappa} = 0$.
8:             Let $\bar{\mathcal{A}} = \mathcal{U}^{(n)} \setminus k$, $\bar{d} = r^{(n)}$ then set $\bar{d}_k = 0$. Define $\bar{\mathcal{I}}$ by letting $\bar{\mathcal{I}}(j) = \bar{\mathcal{I}}^{(n)}_{\mathcal{U}^{(n)}, r^{(n)}}(j)$ for $j \in \bar{\mathcal{A}}$ and $\bar{\mathcal{I}}(j) = \emptyset$ for $j \notin \bar{\mathcal{A}}$.
9:             If $\|\bar{d}\|_1 \leq \bar{M}$, compute $\bar{\kappa} = \xi(\bar{\mathcal{A}}, \bar{d}, \bar{\mathcal{I}})$.
10:             for $m = 1, \cdots, \min\{\bar{m}, \hat{r}_k, \bar{M} - \|\bar{d}\|_1\}$ do
11:                 Let $\mathcal{A}_k = \bar{\mathcal{A}}_k \cup k$, $d = r^{(n)}$ then set $d_k = m$.
12:                 for each $\pi_k \subseteq \{1, \cdots, \hat{r}_k\}$ with $|\pi_k| = d_k$ do
13:                     Let $\mathcal{I} = \bar{\mathcal{I}}$ then set $\mathcal{I}(k) = \pi_k$. If $c_{\max}(\mathcal{A}, d, \mathcal{I}) \leq c$, compute $\xi(\mathcal{A}, d, \mathcal{I})$.
14:                 end for
15:                 Find $\kappa = \max_{\pi_k : \mathcal{I}(k) = \pi_k, |\pi_k| = m, c_{\max}(\mathcal{A}, d, \mathcal{I}) \leq c} \xi(\mathcal{A}, d, \mathcal{I})$ and corresponding $\pi_k^*$.
16:                 If $\kappa > \bar{\kappa}$, then set $b_{m,n} = 1$, $q_{m,n} = \kappa$, $\pi_k'^{(n)} = \pi_k^*$; otherwise let $q_{m,n} = \bar{\kappa}$ and $\pi_k'^{(n)} = \emptyset$.
17:             end for
18:         end for
19:         Compute $V_m = \sum_{n=1}^{m} q_{m,n}$ and find $m^* = \arg\max_m V_m$.
20:         Generate a uniform random number $\varpi \in [0, 1)$. If $V_{m^*} > J$ and $\varpi \leq \epsilon_u$, update the scheduling results as follows. For each $n \in \mathcal{B}$, if $b_{m^*, n} = 1$, then $\mathcal{U}'^{(n)} = \mathcal{U}'^{(n)} \cup k$, $r_k'^{(n)} = m^*$, and $\mathcal{I}'^{(n)} = \mathcal{I}'^{(n)} \cup \pi_k'^{(n)}$.
21:     end for
22:     Let $\mathcal{U}^{(n)} = \mathcal{U}'^{(n)}$, $r^{(n)} = r'^{(n)}$, and $\mathcal{I}^{(n)}_{\mathcal{U}^{(n)}, r^{(n)}} = \mathcal{I}'^{(n)}$. Compute $J = \sum_{n \in \mathcal{B}} \xi(\mathcal{U}^{(n)}, r^{(n)}, \mathcal{I}^{(n)}_{\mathcal{U}^{(n)}, r^{(n)}})$.
23: end for
24: Final output $\{\mathcal{U}^{(n)}, r^{(n)}, \mathcal{I}^{(n)}_{\mathcal{U}^{(n)}, r^{(n)}}\}_{n \in \mathcal{B}}$ and the weighted sum rate $\sum_{n \in \mathcal{B}} \xi(\mathcal{U}^{(n)}, r^{(n)}, \mathcal{I}^{(n)}_{\mathcal{U}^{(n)}, r^{(n)}})$.

below since we consider precoding column subset selection, the rank of the selected column subset will not exceed that of the reported precoding matrix.

(1) Exhaustive search without common rank constraint: For each RB, we obtain the weighted sum rate for all possible user sets and precoding column selections, and find maximum weighted sum rate $\xi(\tilde{\mathcal{U}}^{(n)}, \tilde{r}^{(n)}, \tilde{\mathcal{I}}^{(n)}_{\tilde{\mathcal{U}}^{(n)}, \tilde{r}^{(n)}})$.

(2) Determine the user rank through rank balancing: For each user, we obtain its sum rate over all RBs with $\tilde{r}_k^{(n)} = m$, for each possible rank $m$. We then find $m^*$ which results in the highest user sum rate and set $r_k^* = m^*$. Then update $\tilde{\mathcal{U}}^{(n)}$, $\tilde{r}^{(n)}$, and $\tilde{\mathcal{I}}^{(n)}_{\tilde{\mathcal{U}}^{(n)}, \tilde{r}^{(n)}}$ for all RBs by removing the user from all the RBs with $\tilde{r}_k^{(n)} \neq m^*$. For a user $k$ that is not allocated any RB, we set $r_k^* = 1$.

(3) Based on the determined user rank vector $r^*$, perform exhaustive search to find the optimal user pairing and resource allocation for each RB. Or we can perform a greedy algorithm as in Algorithm 3 with initial settings on user pairing and column selections as determined from rank balancing step output $\{\tilde{\mathcal{U}}^{(n)}, \tilde{r}^{(n)}, \tilde{\mathcal{I}}^{(n)}_{\tilde{\mathcal{U}}^{(n)}, \tilde{r}^{(n)}}\}$.

The detailed procedures are provided in Algorithm 6. Note that the exhaustive search in Step (3) does not incur a higher computation complexity than the greedy pairing as the search space in Step 3 is the subset of that in Step 1. As long as the results in Step 1 are stored, the exhaustive search in Step 3 simply retrieves and compares the results obtained during Step 1.

It can be shown that the proposed Algorithm 6 for MU-MIMO scheduling based on the rank balancing method has a guaranteed worst performance as in following theorem.

Theorem 4.1 *For $\tilde{M} = \bar{m}$, Algorithm 6 achieves $\frac{1}{\bar{m}}$-approximation of the optimal solution of MU-MIMO resource allocation problem given in (16). In particular, for $\bar{m} = 2$, Algorithm 6 achieves $\frac{1}{2}$-approximation of the optimal solution.*

Proof: First, it is easy to see that the exhaustive search for every RB without the common rank constraint in step 1 results in an upper bound of the optimal solution of MU-MIMO scheduling with the common rank constraint as it is a special case of that without such constraint. Now we need to show the final solution from Algorithm 6 is guaranteed to achieve $\frac{1}{\bar{m}}$ of the upper bound. For each user, its overall rate is $\sum_m q_{k,m}$. After rank balancing, the user's rate is then $q_{k,m^*}$. Since $q_{k,m^*} \geq q_{k,m}, \forall m \neq m^*$, we then have $q_{k,m^*} \geq \frac{1}{\bar{m}} \sum_m q_{k,m}$ for every user. Now we need to show that when a user is removed from the scheduled user set, the rate for the other co-scheduled users in the same RB does not decrease. We show that this is true based on Lemma 1. Therefore, the total weighted sum rate after rank balancing is no less than $\frac{1}{m}$ of that before rank balancing. Finally, the exhaustive search with determined ranks or greedy algorithm in step 3 does not reduce the weighted sum rate for every RB, as the greedy algorithm starts with the initial settings given by the output from the rank balancing. ∎

Lemma 1 *For any MU-MIMO transmission with total $S$ co-scheduled streams and equal power allocation, if we remove one column from any precoding matrix and transmit $S - 1$ data streams, the SINR of the MMSE receiver and, consequently, the information rates for the rest $S - 1$ streams do no decrease.*

Proof: Assume that the co-scheduled precoding matrices are $\{V_j\}_{j=1,\ldots,Q}$. The SINR from the MMSE receiver for the $i$th layer of the $j$th user is given by $$\gamma_{i,j} = \frac{\rho}{S} v_{i,j}^\dagger H_j^\dagger (I + \frac{\rho}{S}\Sigma_j)^{-1} H_j v_{i,j}, \qquad (20)$$

where $\Sigma_j = \sum_{(i',j')\neq(i,j)} H_j v_{i',j'} v_{i',j'}^\dagger H_j^\dagger$ is the covariance of all interfering streams. Assuming that one data stream, e.g., the $i$th stream from the $j$th user, is removed from the co-scheduled set, The SINR for other streams after the stream being removed is then given by $$\gamma'_{i,j} = \frac{\rho}{S-1} v_{i,j}^\dagger H_j^\dagger (I + \frac{\rho}{S-1}\Sigma'_j)^{-1} H_j v_{i,j} = \frac{\rho}{S} v_{i,j}^\dagger H_j^\dagger (\frac{S-1}{S}I + \frac{\rho}{S}\Sigma'_j)^{-1} H_j v_{i,j}, \qquad (21)$$

where $\Sigma'_j = \sum_{(i',j')\neq(i,j),(i',j')\neq(\bar{i},j)} H_j v_{i',j'} v_{i',j'}^\dagger H_j^\dagger$. Since $\Sigma'_j \preceq \Sigma_j$, consequently, $\frac{S-1}{S}I + \frac{\rho}{S}\Sigma'_j \preceq I + \frac{\rho}{S}\Sigma_j$, we then have $\gamma'_{i,j} \geq \gamma_{i,j}$. ∎

For $m = \tilde{M} = 2$, we can improve Algorithm 6 by using the following alternative rank balancing method in Step 2.

(2) Determine the user rank through rank balancing:

- For each user, we obtain its sum rate under rank-2 over all the RBs with $\tilde{r}_k^{(n)} = 2$. For rank-1, the sum rate is the summation of its rates over all the RBs with $\tilde{r}_k^{(n)} = 1$ plus the best rank-1 rate from each allocated RB with $\tilde{r}_k^{(n)} = 2$ using any one column of its reported preferred precoding matrix. We then find $m^*$ which results in the highest user sum rate and set $r_k^* = m^*$.

- Then update $\tilde{\mathcal{U}}^{(n)}$, $\tilde{r}^{(n)}$, and $\tilde{\mathcal{I}}^{(n)}_{\tilde{\mathcal{U}}^{(n)},\tilde{r}^{(n)}}$ by removing the user from all the allocations when $\tilde{r}_k^{(n)} = 1$ and $r_k^* = 2$. Keep its allocation and update $\tilde{r}^{(n)}$, and $\tilde{\mathcal{I}}^{(n)}_{\tilde{\mathcal{U}}^{(n)},\tilde{r}^{(n)}}$ if $\tilde{r}_k^{(n)} = 2$ but $r_k^* = 1$. For the user that is not allocated on any RB, we set $r_k^* = 1$.

The details are provided in Algorithm 7. We can shown that the proposed algorithm provides better performance guarantee than Algorithm 6 as given in the following theorem.

Algorithm 6 MU-MIMO scheduling algorithm with rank balancing, algorithm I

1: Initializations: $\mathcal{B} = \{1, \cdots, N\}$, $\mathcal{U} = \{1, \cdots, K\}$, and $r^* = 0$. $\bar{M} = m$.
2: for each $n \in \mathcal{B}$ do
3:     Compute the weighted sum rate $\xi(\mathcal{A}, \boldsymbol{d}, \mathcal{I}_{\mathcal{A},\boldsymbol{d}})$ for each possible user set $\mathcal{A} \subseteq \mathcal{U}$, each $\boldsymbol{d}$ with $\|\boldsymbol{d}\|_1 \leq \bar{M}$, and $d_k \leq \bar{m}$ $\forall\, k$ if $|\mathcal{A}| \geq 2$, $\|\boldsymbol{d}\|_1 \leq \bar{M}$ if $|\mathcal{A}| \leq 1$, along with each possible precoding column selection $\mathcal{I}_{\mathcal{A},\boldsymbol{d}}$.
4:     Find the optimal resource allocations $\{\breve{\mathcal{U}}^{(n)}, \breve{\boldsymbol{r}}^{(n)}, \breve{\mathcal{I}}^{(n)}_{\breve{\mathcal{U}}^{(n)}, \breve{\boldsymbol{r}}^{(n)}}\} = \arg\max \xi(\mathcal{A}, \boldsymbol{d}, \mathcal{I}_{\mathcal{A},\boldsymbol{d}})$.
5: end for
6: If $k \notin \bigcup_n \breve{\mathcal{U}}^{(n)}$ and $k \in \mathcal{U}$, then set $r_k^* = 1$.
7: for each $k \in \mathcal{U}$ do
8:     Obtain $q_{k,m} = \sum_{\breve{r}_k^{(n)} = m} \xi_k(\breve{\mathcal{U}}^{(n)}, \breve{\boldsymbol{r}}^{(n)}, \breve{\mathcal{I}}^{(n)}_{\breve{\mathcal{U}}^{(n)}, \breve{\boldsymbol{r}}^{(n)}})$.
9:     Find $m^* = \arg\max_m q_{k,m}$ and set $r_k^* = m^*$.
10: end for
11: For all $n \in \mathcal{B}$ and all $k \in \mathcal{U}$, if $k \in \breve{\mathcal{U}}^{(n)}$ and $\breve{r}_k^{(n)} \neq r_k^*$, let $\breve{\mathcal{U}}^{(n)} \leftarrow \breve{\mathcal{U}}^{(n)} \setminus k$, $\breve{r}_k^{(n)} = 0$, and update $\breve{\mathcal{I}}^{(n)}_{\breve{\mathcal{U}}^{(n)}, \breve{\boldsymbol{r}}^{(n)}}$.
12: (1) For each RB $n \in \mathcal{B}$, perform exhaustive search over all possible settings with fixed rank $r^*$ and find the best solution $\mathcal{U}^{(n)}$, $\boldsymbol{r}^{(n)}$, and $\mathcal{I}^{(n)}_{\mathcal{U}^{(n)}, \boldsymbol{r}^{(n)}}$. Or
13: (2) For each RB $n \in \mathcal{B}$, with initial set $\mathcal{A} = \breve{\mathcal{U}}^{(n)}$, perform the greedy algorithm similarly as in Algorithm 3 with fixed rank $r^*$.

Theorem 4.2 *For $\bar{m} = \tilde{M} = 2$, Algorithm 7 achieves $\frac{2}{3}$-approximation of the optimal solution of MU-MIMO resource allocation problem given in (16).*

Proof: The proof follows the same procedures as in the proof of Theorem 4.1. We only need to prove that with the alternative rank balancing approach given in Algorithm 7, the resulting rate for a user over all RBs is no less than $\frac{2}{3}$ of the rate from the exhaustive search without common rank constraint. Denote $q'_{k,1} = \sum_{n:\check{r}_k^{(n)}=1} \xi(\check{\mathcal{U}}^{(n)}, \check{r}^{(n)}, \check{\mathcal{I}}^{(n)}_{\check{\mathcal{U}}^{(n)},\check{r}^{(n)}})$, where $\check{\mathcal{U}}^{(n)}, \check{r}^{(n)}, \check{\mathcal{I}}^{(n)}_{\check{\mathcal{U}}^{(n)},\check{r}^{(n)}}$ are obtained from the exhaustive search without common rank constraint. The sum rate of user $k$ before the rank balancing is then given by $q'_{k,1} + q_{k,2}$. The sum rate of user $k$ after rank balancing is then given by $$\max\{q_{k,1}, q_{k,2}\} = \max\left\{q'_{k,1} + \sum_{n:\check{r}_k^{(n)}=2} \mu_{k,n}, q_{k,2}\right\}$$

$$\geq \max\left\{q'_{k,1} + \frac{q_{k,2}}{2}, q_{k,2}\right\}$$

$$\geq \frac{2}{3}(q'_{k,1} + q_{k,2}), \quad (22)$$

where the first inequality follows from Lemma 1 and the approach in which we keep the one with a higher rate. ∎

As aforementioned, based on the UE reported rank, for the users with feedback rank greater than $\bar{m} = 2$, only SU-MIMO transmissions are scheduled. This is because the reported preferred precoding matrix does not have good directional information. To incorporate this constraint, we assume $\bar{m} = 2$ with $\tilde{M} \geq \bar{m}$ and propose another rank balancing based scheduling algorithm consisting of the following steps.

(1) Exhaustive search without common rank constraint for users who have reported rank no more than $\bar{m}$, i.e., for the users in $\tilde{\mathcal{U}}$. For each RB, we obtain the weighted sum rate for all possible user subsets of $\tilde{U}$ and precoding column selections, and find the maximum weighted sum rate.

(2) Perform SU-MIMO greedy algorithm for $\tilde{\mathcal{U}}^c$ according to Algorithm 1 with initial rate for RB $n$, $v_n$, being the weighted sum rate obtain from step (1).

(3) For the RBs on which the weighted sum rates from the step (1) are not updated in step (2), meaning that there is no user in $\tilde{\mathcal{U}}^c$ being scheduled on these RBs, perform the rank balancing and exhaustive search (or greedy search) as in Algorithm 6 or Algorithm 7 to obtain the MU-MIMO scheduling on these RBs.

Algorithm 7 MU-MIMO scheduling algorithm with rank balancing, algorithm II

1: Initializations: $\mathcal{B} = \{1, \cdots, N\}$, $\mathcal{U} = \{1, \cdots, K\}$, and $\boldsymbol{r}^* = 0$. $\bar{m} = \tilde{M} = 2$.
2: for each $n \in \mathcal{B}$ do
3:    Compute the weighted sum rate $\xi(\mathcal{A}, \boldsymbol{d}, \mathcal{I}_{\mathcal{A},\boldsymbol{d}})$ for each possible user set $\mathcal{A} \subseteq \mathcal{U}$, each $\boldsymbol{d}$ with $\|\boldsymbol{d}\|_1 \leq \bar{M}$, and $d_k \leq \bar{m}\ \forall\ k$ if $|\mathcal{A}| \geq 2$, $\|\boldsymbol{d}\|_1 \leq \tilde{M}$ if $|\mathcal{A}| \leq 1$, along with each possible precoding column selection $\mathcal{I}_{\mathcal{A},\boldsymbol{d}}$.
4:    Find the optimal resource allocations $\{\breve{\mathcal{U}}^{(n)}, \breve{\boldsymbol{r}}^{(n)}, \breve{\mathcal{I}}^{(n)}_{\breve{\mathcal{U}}^{(n)},\breve{\boldsymbol{r}}^{(n)}}\} = \arg\max \xi(\mathcal{A}, \boldsymbol{d}, \mathcal{I}_{\mathcal{A},\boldsymbol{d}})$.
5: end for
6: If $k \notin \bigcup_n \breve{\mathcal{U}}^{(n)}$ and $k \in \mathcal{U}$, then set $r_k^* = 1$.
7: for each $k \in \mathcal{U}$ do
8:    Obtain $q_{k,2} = \sum_{n:\breve{r}_k^{(n)}=2} \xi_k(\breve{\mathcal{U}}^{(n)}, \breve{\boldsymbol{r}}^{(n)}, \breve{\mathcal{I}}^{(n)}_{\breve{\mathcal{U}}^{(n)},\breve{\boldsymbol{r}}^{(n)}})$.
9:    For $m = 1$, for each $n \in \mathcal{B}$ with $\breve{r}_k^{(n)} = 2$, let $\boldsymbol{d} = \breve{\boldsymbol{r}}^{(n)}$ then set $d_k = 1$. Let $\mathcal{I} = \breve{\mathcal{I}}^{(n)}_{\breve{\mathcal{U}}^{(n)},\breve{\boldsymbol{r}}^{(n)}}$ and set $\mathcal{I}(k) = \pi_k$, $\pi_k = \{1\}$ or $\pi_k = \{2\}$. Obtain $\mu_n = \max_{\pi_k=\{1\},\pi_k=\{2\}} \xi_k(\breve{\mathcal{U}}^{(n)}, \boldsymbol{d}, \mathcal{I})$ and the corresponding $\pi_k^*$. Set $\tilde{\pi}_k^{(n)} = \pi_k^*$.
10:   Obtain $q_{k,1} = \sum_{n:\breve{r}_k^{(n)}=1} \xi_k(\breve{\mathcal{U}}^{(n)}, \breve{\boldsymbol{r}}^{(n)}, \breve{\mathcal{I}}^{(n)}_{\breve{\mathcal{U}}^{(n)},\breve{\boldsymbol{r}}^{(n)}}) + \sum_{n:\breve{r}_k^{(n)}=2} \mu_n$.
11:   Find $m^* = \arg\max_m q_{k,m}$ and set $r_k^* = m^*$.
12: end for
13: For each $n \in \mathcal{B}$, if $k \in \breve{\mathcal{U}}^{(n)}$, and $\breve{r}_k^{(n)} = 1, r_k^* = 2$, let $\breve{\mathcal{U}}^{(n)} = \breve{\mathcal{U}}^{(n)} \backslash k$, $\breve{r}_k^{(n)} = 0$, and update $\breve{\mathcal{I}}^{(n)}_{\breve{\mathcal{U}}^{(n)},\breve{\boldsymbol{r}}^{(n)}}(k) = \emptyset$. If $\breve{r}_k^{(n)} = 2, r_k^* = 1$, let $\breve{r}_k^{(n)} = 1$, update $\breve{\mathcal{I}}^{(n)}_{\breve{\mathcal{U}}^{(n)},\breve{\boldsymbol{r}}^{(n)}}(k) = \tilde{\pi}_k^{(n)}$.
14: (1) For each RB $n \in \mathcal{B}$, perform exhaustive search over all possible settings with fixed rank $\boldsymbol{r}^*$ and find the best solution $\mathcal{U}^{(n)}, \boldsymbol{r}^{(n)}$, and $\mathcal{I}^{(n)}_{\mathcal{U}^{(n)},\boldsymbol{r}^{(n)}}$. Or
15: (2) For each RB $n \in \mathcal{B}$, with initial settings $\breve{\mathcal{U}}^{(n)}, \breve{\boldsymbol{r}}^{(n)}, \breve{\mathcal{I}}^{(n)}_{\breve{\mathcal{U}}^{(n)},\breve{\boldsymbol{r}}^{(n)}}$, perform the greedy algorithm similarly as in Algorithm 3 with fixed rank $\boldsymbol{r}^*$.

The detailed procedures are provided in Algorithm 8. We can show that the proposed algorithm has the following guaranteed performance.

Theorem 4.3 *Algorithm 8 achieves $\frac{1}{3}$-approximation of the optimal solution of MU-MIMO resource allocation problem given in (16) if the rank balancing procedures follows Algorithm 7 on $\tilde{B}$ for $\tilde{U}$.*

Proof: First, it is easy to see that the exhaustive search for MU pairing on every RB without the common rank constraint for user in $\tilde{U}$ together with the SU-MIMO optimal solution for $\tilde{U}^c$ gives an upper bound of weighted sum rate over all RBs from the optimal solution of (16). On the other hand, it has been shown from [9] that because of satisfying the submodularity condition, the greedy SU-MIMO scheduling achieves is $\frac{1}{2}$-approximation of the optimal solution of the SU-MIMO scheduling problem with common rank constraint. We can see that if we treat the resulting rate from exhaustive search for MU pairing without common rank constraint for $\tilde{U}$ on every RB as the SU-MIMO rate from a virtual user $\tilde{k}$ with a fixed transmission mode, the submodularity condition is then held for the SU-MIMO scheduling on the user set $\tilde{U}^c \cup \tilde{k}$. The resulting weighted sum rate from greedy SU-MIMO scheduling algorithm as in Algorithm 1 achieves $\frac{1}{2}$-approximation of the upper bound. From Theorem 4.2, the rank balancing achieves $\frac{2}{3}$-approximation of the upper bound of weighted sum rate for users in $\tilde{U}$. Therefore the final solution achieves no less than $\frac{1}{3}$ of the upper bound, consequently, a guaranteed $\frac{1}{3}$-approximation of the optimal solution of (16). ∎

5 Numerical Results

We now evaluate the performance of the presented MU-MIMO scheduling algorithms. For all the simulations, we set the number of RBs being 10 and the weights for all users being one. The near-orthogonal user pairing with the threshold $\epsilon = 0.3$ is employed. Also we assume that the scheduling is based on implicit SU-MIMO channel feedback with a preferred precoding matrix, a rank, and SINR for each layer. We assume that there is not SINR mismatch thus the exact channel is used for compute SINR for each layer. The quantized channel feedback is based on the precoding codebook defined in [11].

5.1 Performance of MU-MIMO Scheduling with $M_t = 4$ and $M_r = 2$

We first present the performance of MU-MIMO Scheduling in the system equipped with 4 transmit antennas at the base station and 2 receiver antennas per user. With this antenna setting, the ---
Algorithm 8 MU-MIMO scheduling algorithm with rank balancing, algorithm III
---
1: Initializations: $\mathcal{B} = \{1, \cdots, N\}$, and $r^* = 0$. Based on the user rank feedback vector $\hat{r}$, form the user set $\tilde{\mathcal{U}} = \{k|\hat{r}_k \leq \bar{m}\}$ and $\tilde{\mathcal{U}}^c = \{k|\hat{r}_k > \bar{m}\}$.

2: for each $n \in \mathcal{B}$ do

3:     Compute the weighted sum rate $\xi(\mathcal{A}, d, \mathcal{I}_{\mathcal{A},d})$ for each possible user set $\mathcal{A} \subseteq \tilde{\mathcal{U}}$, each $d$ with $\|d\|_1 \leq \bar{M}$, and $d_k \leq m \ \forall \ k$ if $|\mathcal{A}| \geq 2$, $\|d\|_1 \leq \bar{M}$ if $|\mathcal{A}| \leq 1$, along with each possible precoding column selection $\mathcal{I}_{\mathcal{A},d}$.

4:     Find the optimal resource allocations $\{\tilde{\mathcal{U}}^{(n)}, \check{r}^{(n)}, \check{\mathcal{I}}^{(n)}_{\tilde{\mathcal{U}}^{(n)}, \check{r}^{(n)}}\} = \arg\max \xi(\mathcal{A}, d, \mathcal{I}_{\mathcal{A},d})$.

5: end for

6: Let $\nu_n = \xi(\tilde{\mathcal{U}}^{(n)}, \check{r}^{(n)}, \check{\mathcal{I}}^{(n)}_{\tilde{\mathcal{U}}^{(n)}, \check{r}^{(n)}})$ for all $n \in \mathcal{B}$, with $\mathcal{U} = \tilde{\mathcal{U}}^c$, perform greedy SU-MIMO scheduling according Algorithm 1. Obtain updated rate $\nu_n^*$ for all $n \in \mathcal{B}$ and scheduling solution $\chi_{k,m,n}$ for $k \in \tilde{\mathcal{U}}^c$.

7: Find the RB set $\tilde{\mathcal{B}}$ where for $n \in \tilde{\mathcal{B}}$, $\xi(\tilde{\mathcal{U}}^{(n)}, \check{r}^{(n)}, \check{\mathcal{I}}^{(n)}_{\tilde{\mathcal{U}}^{(n)}, \check{r}^{(n)}}) = \nu_n^*$ and $\chi_{k,m,n} = 0 \ \forall k \in \tilde{\mathcal{U}}^c$.

8: With RB set $\tilde{\mathcal{B}}$ and user set $\tilde{\mathcal{U}}$, given exhaustive search results without common rank constraint $\{\tilde{\mathcal{U}}^{(n)}, \check{r}^{(n)}, \check{\mathcal{I}}^{(n)}_{\tilde{\mathcal{U}}^{(n)}, \check{r}^{(n)}}\}$ for $n \in \tilde{\mathcal{B}}$, obtain the scheduling solution according to step 6-12 in Algorithm 6 or step 7-14 in Algorithm 7.
--- highest feedback rank is 2. Thus the constraint on the maximum number of layers per user $m = 2$ for MU pairing is naturally satisfied. All the users can be the candidates for MU pairing.

Figure 1 shows the throughput performance as a function of average SNR for various MU-MIMO scheduling methods with rank-1 restriction, namely, the optimal algorithm by exhaustive search, the greedy algorithm, and the improved greedy algorithm with $T = 4$. The performance of the SU-MIMO greedy scheduling algorithm is also presented for comparisons. The i.i.d. Rayleigh fading is employed and the total number of users $K = 10$. The ZF beamforming is also implemented in MU-MIMO schedulers. We assume that each user reports the best rank and the corresponding preferred precoding matrix for each RB. We can see that the greedy algorithm performs close to optimal algorithm in the low SNR region, but shows some performance degradation in the moderate-to-high SNR region. The improved greedy algorithm indeed shows some improvement over the original greedy algorithm and performs very close to the optimal algorithm. The cost for this improvement is additional complexity. It is seen that the MU-MIMO with improved greedy scheduling algorithm performs better than the SU-MIMO throughout the SNR region. However, the MU-MIMO gain, or the performance gap over the SU-MIMO, becomes very small when SNR is high. This is because for high SNR, most feedbacks are rank-2 feedback. The MU-MIMO with rank-1 restriction experiences a large performance degradation as the preferred strongest channel direction is not available at the base station.

The performance of the iterative MU-MIMO scheduling algorithm and the greedy algorithm with rank-fixing through SU-MIMO scheduling is illustrated in Fig. 2. The performance of optimal scheduling with rank-1 restriction and SU-MIMO greedy scheduling method is also provided for comparison. Again, we consider $K = 10$ and i.i.d. Rayleigh fading. For the iterative method, three threshold values for stochastic updating are evaluated, i.e., $\epsilon_u = 0.5, 0.25$, and $0.1$. We can see from Fig. 2 that the rank-fixing method performs only slightly better than the SU-MIMO at low SNR. The iterative method shows a large performance gap to the rank-fixing method and the methods with rank-1 restriction. Different updating threshold settings only slightly change the performance.

Figure 3 illustrates the performance of rank-balancing MU-MIMO scheduling methods in comparisons of the MU-MIMO scheduling methods with rank-1 restrictions and the SU-MIMO performance. Both results of Algorithm 6 and 7 are presented and denoted as "Rank Bal. 1/2" and "Rank Bal. 2/3", respectively. The optimal results without common rank constraint are obtained from the step 1 for rank balancing methods, which is the upper bound of the optimal solution of MU-MIMO scheduling with common rank constraint. Instead of i.i.d. Rayleigh fading, the small scale fading is generated according to the ITU urban micro (UMi) channel model with co-polarized (uniform linear array or ULA) antenna settings. For ULA antenna settings, the dominant singular value is larger than the other ones. Therefore, it is more favorable to the rank-1 transmissions for each user. In this case, the MU-MIMO is supposed to provide large gain over SU-MIMO due to multiuser diversity. We can see from Figure 3 that the performance of MU-MIMO from all scheduling methods is indeed much better than that of SU-MIMO. We can also see that two rank balancing MUMO scheduling algorithms with either exhaustive search or greedy pairing at step 3 perform close to each other and both outperform the greedy and improved greedy scheduling methods with rank-1 restrictions. Moreover, the rank balancing methods with exhaustive search at step 3 slightly outperform the optimal exhaustive method with rank-1 restriction and they all perform close to the upperbound of the optimal solution of MU-MIMO transmissions.

We now evaluate all scheduling methods shown in Figure 3 again but with cross polarized (Xpol) antenna settings. The results are shown in Figure 4. For Xpol antennas, the dominate singular value of the channel gain matrix may not be significantly larger than the other singular values. Therefore, for SU-MIMO, rank-2 transmissions are highly possible at high SNRs. We can see from Figure 4 that the SU-MIMO performance is improved which is now better than greedy MU-MIMO scheduling with rank-1 restrictions. Again the rank balancing MU-MIMO scheduling methods with exhaustive search at step 3 outperforms all the other approaches.

Figure 5 shows the performance of same scheduling methods for Xpol antenna settings but with $K=5$. All the other settings are exactly same as that in Figure 4. We can see that with less active users, the performance of SU-MIMO is better than that of the MU-MIMO with rank-1 restrictions and greedy scheduling and is also slightly better than the optimal MU-MIMO pairing with rank-1 restrictions and the rank balancing with greedy pairing after user rank being determined. The rank balancing method with exhaustive search, however, performs better than SU-MIMO and optimal user pairing with rank-1 restrictions with larger gap than that for the 10-user case.

Figure 6 to Figure 9 provide the performance comparison of the same MU-MIMO scheduling methods as before, but considering the common rank feedback which is a realistic assumption. The antenna setting and feedback option on PMI for these four figures are ULA plus wideband PMI (common PMI for all RBs), Xpol plus wideband PMI, ULA plus subband PMI (per RB PMI feedback), and Xpol plus subband PMI, respectively. As we can see that the results are similar to that with the subband best rank feedback as in Figure 3 and Figure 4, indicating that the feedback rank is quite uniform along the RBs. Again, we can see that the rank balancing based scheduling methods provide better or at least not worse performance than the other schemes.

5.2 Performance of MU-MIMO Scheuduling with $M_t = 4$ and $M_r = 4$

We now present the performance of MU-MIMO Scheduling in the system equipped with 4 transmit antennas at the base station and 4 receiver antennas per user. The feedback rank can be up-to 4. Thus some users with high rank feedbacks can only be scheduled as SU-MIMO transmissions. We now implement the MU-MIMO scheduling according to Algorithm 8. The results for various scheduling methods are illustrated in Figure 10 including the rank balancing based scheduling and the greedy, the improved greedy, and optimal exhaustive search with rank-1 restrictions. We also show the performance of the MU pairing with the rank being fixed as the feedback rank for comparisons. The SU-MIMO performance with greedy SU scheduling is also illustrated. We consider wideband PMI feedback and Xpol antennas. We can see the rank balancing method outperforms all scheduling methods with rank-1 restrictions as well as the SU-MIMO and the MU with fixed rank. However, it is surprising that the MU pairing with rank fixing performs fairly well, which only has a small performance gap from the rank balancing scheme. From the statistics of rank feedback in the same range of SNRs shown in Figure 11, we can see that since we consider a uniform geometry user deployment with the same average SNR for all users, the feedback ranks from all users are not quite diverse. If they are diverse as in the practical cellular system where the users are located on different geometry from the base station, we expect that the gain of rank balance based scheduling method over the other schemes will get improved.

6 Conclusions

In this paper, we have considered the DL MU-MIMO scheduling for wideband MIMO-OFDM for LTE-A cellular systems. Considering the practical constraints, particularly, the common rank constraint, imposed by LTE-A standard, we have proposed several scheduling algorithms which support dynamic change between SU and MU-MIMO transmissions. In particular, we have proposed a novel rank balancing method to determine a uniform transmission rank along all RBs for each user. We have shown that the proposed MU-MIMO scheduling algorithms based on the rank balancing method achieve a worst-performance guarantee. We have also proposed several other schemes including improved greedy algorithm with rank restriction, iterative MU-MIMO scheduling with a stochastic update, and a rank fixing method based on SU-MIMO greedy scheduling. The simulation results have shown that the proposed rank balancing based scheduling algorithms provide better throughput performance than other approaches.

What is claimed is:

1. A method for user pairing and resource allocation, the method comprising steps of:
   a) performing a multiuser multi-input-multi-output (MU-MIMO) user pairing computer process to maximize an objective metric without common rank restriction;
   b) performing a rank balancing computer process to determine a uniform transmission user rank along all allocated resource blocks for each user;
   c) with the uniform transmission user rank fixed for the users, determining in a computer process optimal user pairing and allocation for the resource blocks
   for each user, determining the each user's sum rates over all the resource blocks allocated to this user from step a) and an objective metric having the same rank;
   fixing the rank of a selected one of the users as a rank that has the highest sum rate;
   when the selected one of the users has a rank-2, removing all the user's rank-1 resource block allocations;
   when the selected one of the users does not have a rank-2, retaining all the user's allocated resource blocks; and
   for the users that are not allocated on any of the resource blocks, setting their rank equal to one (1).

2. The method according to claim 1, wherein step a) comprises the steps of:
   for each resource block, determining weighted sum rates for all possible candidate user subsets that are co-scheduled for MU-MIMO transmissions and for all possible precoding column selections; and
   finding a maximum weighted sum rate.

3. The method according to claim 1, wherein step a) comprises the steps of:
   performing an exhaustive search computer process, which is subject to a near-orthogonality constraint applied to the resource blocks, to determine the MU-MIMO user pairing.

4. The method according to claim 3, wherein for each user that has a reported rank-2 preferred precoding matrix, both columns of an indicated precoding matrix are considered as valid rank-1 precoding vectors for that user.

5. The method according to claim 4, further comprising the step of:
   for the resource blocks with a rank-2 allocation for a selected one of the users, determining a best rank-1 rate by considering both columns of that resource block's rank-2 precoder matrix.

6. The method according to claim 5, wherein the sum rate of rank-1 includes rates from the allocated resource blocks having rank-1 and the best rank-1 rate from the allocated resource blocks having the rank-2 allocation for a selected user.

7. The method according to claim 1, wherein step b) comprises the steps of:
   removing the selected one of the users from all the resource block allocations with other ranks.

8. The method according to claim 1, wherein step c) comprises the step of:
   comparing the results of step a) on each of the resource blocks with the user rank determined from step b) to determine the optimal user pairing and allocation for the resource blocks.

9. The method according to claim 8, wherein the comparing step is performing by an exhaustive search or greedy computer process.

10. The method according to claim 1, wherein the objective metric comprises a weighted sum rate.

11. A method for user pairing and resource allocation, the method comprising steps of:
    i) providing first and second mutually exclusive user sets for all candidate users, the first user set containing the candidate users that can be scheduled for multiuser multi-input-multi-output (MU-MIMO) transmissions, and the second user set containing ones of the candidate users that can only be scheduled for single-user multi-input-multi-output (SU-MIMO) transmissions;
    ii) for the first user set that can be scheduled for MU-MIMO transmissions,
       a) performing a MU-MIMO user pairing computer process to maximize an objective metric without common rank restriction;
    iii) starting with an allocated rate from step ii), performing a greedy or exhaustive computer process to determine the SU-MIMO scheduling for the second user set;
    iv) comparing the results in step ii) and step iii), and for each of a plurality of resource blocks on which allocated users have been updated using SU-MIMO scheduling in step iii), selecting a updated allocation as a final user allocation result;
    wherein for the resource blocks on which the allocated users have not been updated using SU-MIMO scheduling in step iii);
       b) performing a rank balancing computer process to determine a uniform transmission user rank along those allocated resource blocks for each user in the first user set; and
       c) with a uniform transmission user rank fixed for all the users in the first user set, determining in a computer process optimal user pairing and allocation for each of the resource blocks for each user.

12. The method according to claim 11, wherein step a) comprises the steps of:
    for each resource block, determining weighted sum rates for all possible candidate user subsets in the first user set that are co-scheduled for MU-MIMO transmissions and for all possible precoding column selections; and
    finding a maximum weighted sum rate.

13. The method according to claim 11, wherein step a) comprises the steps of:
    performing an exhaustive search computer process over the first users set, which is subject to a near-orthogonality constraint applied to each of the resource blocks, to determine the MU-MIMO user pairing.

14. The method according to claim 13, wherein for each user that has a reported rank-2 preferred precoding matrix, both columns of an indicated precoding matrix are considered as valid rank-1 precoding vectors for that user.

15. The method according to claim 14, further comprising the step of:
    for the resource blocks with a rank-2 allocation for a selected one of the users, determining a best rank-1 rate by considering both columns of that resource block's rank-2 precoder matrix.

16. The method according to claim 11, wherein step b) comprises the steps of:
    for each user, determining the each user's sum rates over all the resource blocks allocated to this user from step a) and an objective metric having the same rank;
    fixing the rank of a selected one of the users as a rank that has a highest sum rate;
    when the selected one of the users has a rank-2, removing all the user's rank-1 resource block allocations;

when the selected one of the users does not have a rank-2, retaining all the user's allocated resource blocks;

for the users that are not allocated on any of the resource blocks, setting their rank equal to one (1).

17. The method according to claim 16, wherein the sum rate of rank-1 includes rates from the allocated resource blocks having rank-1 and the best rank-1 rate from the allocated resource blocks having the rank-2 allocation for a selected user.

18. The method according to claim 11, wherein step b) comprises the steps of:

for each user, determining the user's sum rates over the resource blocks allocated to this user from step a) and the objective metric having the same rank;

fixing the rank of a selected one of the users as a rank that has a highest sum rate;

removing the selected one of the users from all the resource block allocations with other ranks;

for the users that are not allocated on any of the resource blocks, setting their rank equal to one (1).

19. The method according to claim 11, wherein step c) comprises the step of:

comparing the results of step a) on each of the resource blocks with the user rank determined from step b) to determine the optimal user pairing and allocation for each of the resource blocks for each user.

20. The method according to claim 19, wherein the comparing step is performing by an exhaustive search or greedy computer process.

21. The method according to claim 11, wherein the objective metric comprises a weighted sum rate.

* * * * *